United States Patent
Zhang et al.

(10) Patent No.: US 12,230,018 B2
(45) Date of Patent: Feb. 18, 2025

(54) FREE SPACE ESTIMATOR FOR AUTONOMOUS MOVEMENT

(71) Applicant: Volvo Car Corporation, Gothenburg (SE)

(72) Inventors: Xinkai Zhang, Sunnyvale, CA (US); Sihao Ding, Sunnyvale, CA (US); Harshavardhan Reddy Dasari, Santa Clara, CA (US)

(73) Assignee: Volvo Car Corporation, Gothenburg (SE)

( * ) Notice: Subject to any disclaimer, the term of this patent is extended or adjusted under 35 U.S.C. 154(b) by 275 days.

(21) Appl. No.: 17/805,710

(22) Filed: Jun. 7, 2022

(65) Prior Publication Data
US 2023/0394805 A1   Dec. 7, 2023

(51) Int. Cl.
| | |
|---|---|
| *G06V 10/80* | (2022.01) |
| *G01S 15/86* | (2020.01) |
| *G01S 15/931* | (2020.01) |
| *G05D 1/00* | (2006.01) |
| *G06T 7/13* | (2017.01) |

(52) U.S. Cl.
CPC ............ *G06V 10/803* (2022.01); *G01S 15/86* (2020.01); *G01S 15/931* (2013.01); *G05D 1/0253* (2013.01); *G06T 7/13* (2017.01); *G06T 2207/30261* (2013.01)

(58) Field of Classification Search
CPC .... G06V 10/803; G06V 20/586; G01S 15/86; G01S 15/931; G05D 1/0253; G06T 7/13; G06T 2207/30261
See application file for complete search history.

(56) References Cited

U.S. PATENT DOCUMENTS

| | | | | |
|---|---|---|---|---|
| 2015/0019043 A1* | 1/2015 | Creasey | ............... | G05D 1/0038 701/2 |
| 2020/0408892 A1* | 12/2020 | Choi | ....................... | G01S 13/72 |

(Continued)

OTHER PUBLICATIONS

Extended European Search Report received for European Patent Application Serial No. 23177514.9 dated Oct. 13, 2023, 7 pages.

(Continued)

*Primary Examiner* — Alazar Tilahun
(74) *Attorney, Agent, or Firm* — Amin, Turocy & Watson, LLP

(57) ABSTRACT

One or more embodiments herein can enable identification of an obstacle free area about an object. An exemplary system can comprise a memory that stores computer executable components, and a processor that executes the computer executable components stored in the memory, wherein the computer executable components can comprise an obtaining component that obtains raw data defining a physical state of an environment around an object from a vantage of the object, and a generation component that, based on the raw data, generates a dimension of a portion or more of a virtual polygon representing a boundary about the object, wherein the boundary bounds free space about the object. A sensing sub-system can comprise both an ultrasonic sensor and a camera that can separately sense the environment about the object from the vantage of the object to thereby generate separate polygon measurement sets.

20 Claims, 11 Drawing Sheets

(56) References Cited

U.S. PATENT DOCUMENTS

2021/0374438 A1* 12/2021 Shmueli .............. G01S 7/52004
2022/0234515 A1* 7/2022 Cruz ....................... B60R 11/00

OTHER PUBLICATIONS

Gao et al., "Deformable Radar Polygon: A Lightweight and Predictable Occupancy Representation for Short-range Collision Avoidance", arXiv:2203.01442v1, Mar. 2, 2022, 8 pages.
Communication Pursuant to Rule 69 EPC received for European Patent Application Serial No. 23177514.9 dated Dec. 18, 2023, 2 pages.

* cited by examiner

FREE SPACE ESTIMATOR FOR AUTONOMOUS MOVEMENT

TECHNICAL FIELD BACKGROUND

The subject disclosure relates generally to estimation of free space about an object, and more specifically to estimation of movement space about a vehicle for autonomous movement of the vehicle.

BACKGROUND

In existing technologies, an occupancy grid can be generated, providing a high-detail, computationally-intensive understanding of free space about an object. The occupancy grid generation is timely, employs large data storage volumes and/or memory, and is inefficient. Relative to a dynamically changing environment about an object, such as a moving vehicle, the generation of such occupancy grid cannot provide valuable data on a quick, efficient and/or real-time basis for a moving object (e.g., moving vehicle). That is, the large amount of data to be generated, large amount of calculations to be performed, and large amount of memory to be consumed cannot provide a fast, yet accurate, estimation of free space about a moving vehicle. These aspects further cannot provide reactive representations of such free space relative to unforeseen, emergency and/or otherwise unintended changes in the environment about a moving vehicle.

SUMMARY

The following presents a summary to provide a basic understanding of one or more embodiments described herein. This summary is not intended to identify key or critical elements, or to delineate any scope of the particular embodiments and/or any scope of the claims. The sole purpose of the summary is to present concepts in a simplified form as a prelude to the more detailed description that is presented later.

In one or more embodiments described herein, devices, systems, methods and/or apparatuses are described that can provide determination of free space about an object, such as a moving object. For example, provided can be a computationally efficient, data-lightweight free space estimator to determine and represent the drivable area around a vehicle that is free of obstacles for the vehicle to drive, such as autonomously.

According to one embodiment, a system can comprise a memory that stores computer executable components, and a processor that executes the computer executable components stored in the memory, wherein the computer executable components comprise an obtaining component that obtains raw data defining a physical state of an environment around an object from a vantage of the object, and a generation component that, based on the raw data, generates a dimension of a portion or more of a virtual polygon representing a boundary about the object, wherein the boundary bounds free space about the object.

In one or more embodiments, the generation component can generate first polygon measurements from first raw data from an ultrasonic sensor and second polygon measurements from second raw data from a camera, wherein the first and second raw data are comprised by the raw data, and wherein the virtual polygon is based on a combination of the first polygon measurements and the second polygon measurements.

According to another embodiment, a computer-implemented method can comprise obtaining, by a system operatively coupled to a processor, raw data regarding a physical state of an environment around an object from a vantage of the object, and generating, by the system, based on the raw data, a dimension of a portion or more of a virtual polygon representing a boundary about the object, wherein the boundary bounds free space about the object.

In one or more embodiments, the computer-implemented method can comprise combining, by the system, separate sets of polygon measurements based on raw data from separate sensing element types, and employing, by the system, the combination of the polygon measurements to generate the virtual polygon.

According to yet another embodiment, a computer program product providing a process to determine free space around an object can comprise a non-transitory computer readable storage medium having program instructions embodied therewith, the program instructions executable by a processor to cause the processor to obtain, by the processor, raw data regarding a physical state of an environment around an object from a vantage of the object, and generate, by the processor, based on the raw data, a dimension of a portion or more of a virtual polygon representing a boundary about the object, wherein the boundary bounds free space about the object.

In one or more embodiments, the program instructions can be further executable by the processor to case the processor to combine, by the processor, polygon measurements based on raw data from separate sensing elements, and employ, by the processor, the combination of the polygon measurements to generate the virtual polygon.

An advantage of the device, system, computer-implemented method and/or computer program product discussed above can be a lightweight estimation process that can be employed rapidly relative to unforeseen, emergency and/or otherwise unintended changes in the environment about a moving vehicle. That is, the estimation process can comprise low memory consumption, restricted data vectors and/or reduced computation, such as compared to conventional approaches.

Another advantage of the device, system, computer-implemented method and/or computer program product discussed above can be an ability to obtain accurate measurements relative to an environment close to the object and relative to an environment further form the object. This can be enabled by use of both one or more camera sensors and one or more ultrasonic sensors.

Another advantage of the device, system, computer-implemented method and/or computer program product discussed above can be rapid provision of a recommendation or control for movement of the object, such as where the object is already in motion. That is, a heavyweight estimation process cannot quickly provide the data necessary to allow a rapid provision of a recommendation or control for movement of an object, particularly relative to heavyweight occupancy grid determinations.

Yet another advantage of the device, system, computer-implemented method and/or computer program product discussed above can be employment of an artificial intelligence (AI) model, neural network (NN), machine learning (ML) model and/or deep learning (DL) model to generate polygon measurements defining a free space area about the object. Separate polygon measurements can be generated from raw data from each of one or more camera sensors and one or more ultrasound sensors, which polygon measurements can be combined and/or fused to provide an accurate and efficient global estimation of free space area about the object.

Furthermore, another advantage of the device, system, computer-implemented method and/or computer program product discussed above can be employing of an AI model, NN, ML model and/or DL model to balance the raw data and/or polygon measurements from different sensors relative to one another, such as due to noise. The noise can comprise variance and/or error attributable to system noise, weather and/or the like.

DESCRIPTION OF THE DRAWINGS

One or more exemplary embodiments are described below in the Detailed Description section with reference to the following drawings.

DETAILED DESCRIPTION

Figure 1:
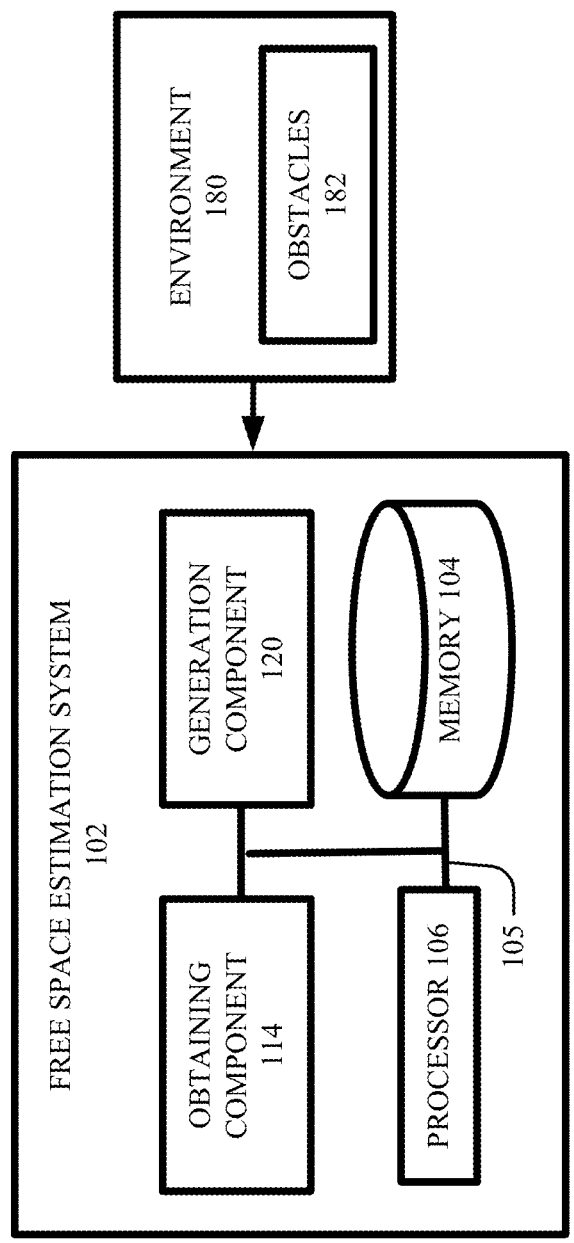
FIG. 1 illustrates a block diagram of a free space estimation system that can enable a process to determine free space around an object, in accordance with one or more embodiments described herein.

The following detailed description is merely illustrative and is not intended to limit embodiments and/or application or uses of embodiments. Furthermore, there is no intention to be bound by any expressed and/or implied information presented in the preceding Background and/or Summary sections, and/or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details. It will be understood that when an element is referred to as being "coupled" to another element, it can describe one or more different types of coupling including, but not limited to, chemical coupling, communicative coupling, electrical coupling, electromagnetic coupling, operative coupling, optical coupling, physical coupling, thermal coupling, and/or another type of coupling. Likewise, it will be understood that when an element is referred to as being "connected" to another element, it can describe one or more different types of connecting including, but not limited to, electrical connecting, electromagnetic connecting, operative connecting, optical connecting, physical connecting, thermal connecting, and/or another type of connecting.

As used herein, the terms "entity", "requesting entity" and "user entity" can refer to a machine, device, component, hardware, software, smart device and/or human.

As used herein, "data" can comprise metadata.

As used herein, "use" can comprise access to.

As used herein, "cost" can refer to time, money, power, storage, memory, bandwidth, manual labor and/or the like.

While one or more devices and/or systems are described below with reference to a wheeled vehicle, such as an automobile, the one or more embodiments described herein are not limited to this use. Further, while one or more devices and/or systems are described below with reference to a driving vehicle capable of at least partial autonomous driving, the one or more embodiments described herein also can be applicable to use in non-autonomous cases and/or with non-autonomous vehicles, objects and/or the like. A free space estimation system described herein can be implemented in any suitable electronic driving, control and/or navigation system such as, for instance, at an electric vehicle (EV). Indeed, the one or more devices and/or systems described herein can be utilized with any of a military vehicle, marine vehicle such as a boat or marine drone, winged vehicle such as a plane, and/or rotor-ed vehicle such as a helicopter or drone. Likewise, usage can extend to a robot and/or any suitable moving device.

Turning now to the figures, one or more embodiments described herein can include one or more devices, systems, apparatuses and/or system-implemented methods that can enable a process to determine free space around an object, such as a moving vehicle. Generally, the one or more embodiments can provide an efficient, reliable and reactive occupancy representation for movement of an object, such as for autonomous braking in low-speed maneuvers, such as parking.

Generally, a free space estimation system as described herein can employ raw data (e.g., data and/or metadata) from one or more sensors at an object. The raw data can be converted to raw measurements which can be employed by an innovative framework described herein to define a physical state of an environment about the object, from a vantage of the object.

The framework generally can comprise generation of two or more sets of polygon measurements that separately define separate polygons. The separate sets of polygon measurements can be generated from raw data from one or more camera and/or ultrasonic sensors. The separate polygons (e.g., virtual polygons) can bound available free space about an object, such as from a vantage of the object. That is, the virtual polygons can be represented virtually, whether or not such polygons are presented visually (e.g., in an image via an imaging device, screen and/or the like) to a user entity.

The separate sets of polygon measurements can be adjusted to account for system noise, error, and/or noisy data (e.g., due to weather, visibility and/or the like) and fused together. The fusion can employ additional data from one or more auxiliary sensors of the object, such as sensors not comprising camera and/or ultrasonic sensors, and/or data from one or more previous free space estimations. An output can be a global estimation of free space about the object, which output can be employed as historical data for a subsequent iteration of the free space estimation framework.

In one or more embodiments, an analytical model, such as an AI model, NN, ML model and/or DN model, can be employed to generate the global estimation. Generally, an analytical model can be employed for generating polygon measurements from camera sensor raw data, for generating polygon measurements from ultrasonic sensor (USS) raw data, and/or for adjusting the polygon measurements relative to one another, such as indicated above to account for system noise, error, and/or noisy data. In one or more embodiments, separate AI models, such as deep neural networks (DNNs) can be employed for each of these three processes. By learning and continually updating recognition of objects versus free space, such as relative to different types of raw data from different sensor types, accuracy to complete polygon generation can be increased and/or time to complete polygon generation can be reduced. Furthermore, data and/or generated measurements from previous iterations of free space estimation can be employed to train the one or more analytical models at any suitable frequency.

Looking first to FIG. 1, a non-limiting system 100 is illustrated that can comprise one or more devices, systems, and/or apparatuses that can enable a process to determine available free space about an object, such as a moving object, in accordance with one or more embodiments described herein. While referring here to one or more processes, facilitations, and/or uses of the non-limiting system 100, description provided herein, both above and below, also can be relevant to one or more other non-limiting systems described herein, such as the non-limiting system 200, to be described below in detail.

The non-limiting system 100 can enable both a process to obtain measurements from an environment 180, such as relative to one or more obstacles 182 in the environment 180, and to generate a representation of free space about an object from the measurements obtained. As illustrated, the non-limiting system 100 can comprise a free space estimation system 102 comprising a processor 106, memory 104, bus 105, obtaining component 114 and generation component 120. Generally, the obtaining component 114 can obtain raw da defining a physical state of the environment 180 around an object from a vantage of the object. Generally, the generation component 120 can, based on the raw data, generate a dimension of a portion or more of a virtual polygon representing a boundary about the object, wherein the boundary bounds free space (e.g., absent obstacles 182) about the object.

In one or more embodiments, the object can comprise the free space estimation system 102. In one or more other embodiments, the free space estimation system 102 can be at least partially separate from the object but can obtain raw data and/or measurements from one or more sensors at the object.

One or more aspects of a component (e.g., the obtaining component 114 and/or generation component 120) can be employed separately and/or in combination, such as employing one or more of the memory 104 or the processor 106. Additionally, and/or alternatively, the processor 106 can execute one or more program instructions to cause the processor 106 to perform one or more operations by these components. The bus 105 can enable local communication between the elements of the free space estimation system 102.

Figure 2:
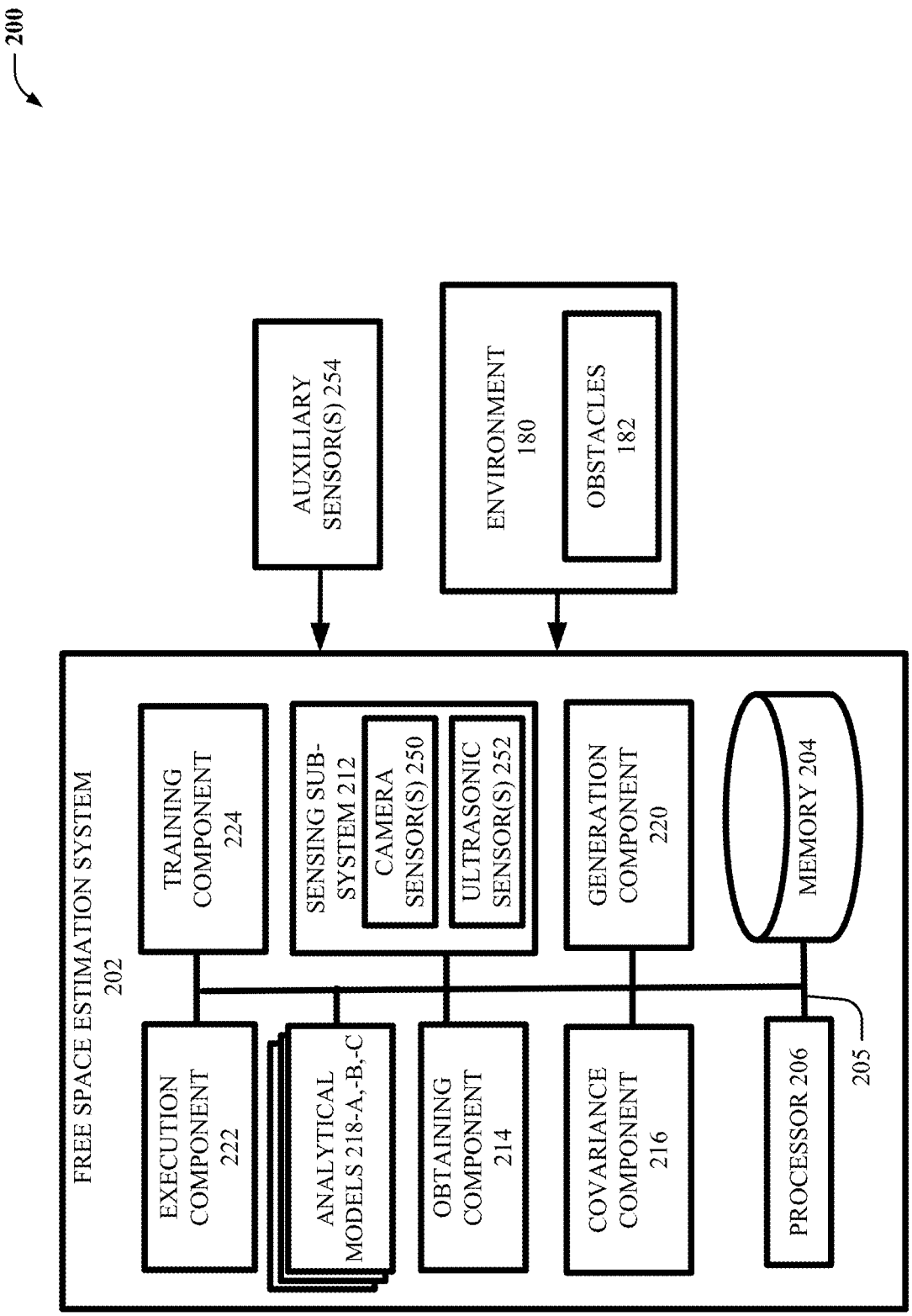
FIG. 2 illustrates a block diagram of another free space estimation system that can enable a process to determine free space around an object, in accordance with one or more embodiments described herein.

Turning next to FIG. 2, a non-limiting system 200 is depicted. One or more embodiments of the non-limiting system 200 described herein can include one or more devices, systems and/or apparatuses that can enable a process to determine available free space about an object, such as a moving object, in accordance with one or more embodiments described herein. Repetitive description of like elements and/or processes employed in respective embodiments is omitted for the sake of brevity. While referring here to one or more processes, facilitations, and/or uses of the non-limiting system 200, description provided herein, both above and below, also can be relevant to one or more non-limiting systems or elements of other non-limiting systems described herein, such as the non-limiting system 100.

The non-limiting system 200 can comprise a free space estimation system 202 that can enable a process to determine free space about an object, such as a moving object. Generally, the free space estimation system 202 can enable both a process to obtain measurements based on an environment 180, such as relative to one or more obstacles 182 in the environment 180, and to generate a representation of free space about an object from the measurements obtained. Accordingly, when the object, such as an autonomously moving vehicle, encounters an emergency, unforeseen and/or unintended situation, such as where a low-speed emergency braking operation can be employed, sufficient, adequate and/or accurate data can be available to determine a free space estimation result (also herein referred to as a global estimation) defining free space about the object, from the vantage of the object, such as absent presence of obstacles.

Generally, to allow for quick provision of accurate data, without over-computation, large memory consumption, and/or heavy-weight occupancy grid map generation, a lightweight free space estimation framework can be employed. This lightweight framework can generally comprise generation and noise adjustment of measurements for plural polygon-shaped boundaries. These boundaries can be fused together to provide a more accurate representation of an obstacle-free boundary, at distances both near to and far from the object, than either polygon-shaped boundary alone. The measurements further can be modified by (e.g., supplemented by) auxiliary sensor data other than camera and/or ultrasonic sensor data. The polygon-shaped boundary generations and noise adjustment each can be enabled by an analytical model.

The free space estimation system 202, as illustrated, can comprise any suitable type of component, machine, device, facility, apparatus, and/or instrument that comprises a processor and/or can be capable of effective and/or operative communication with a wired and/or wireless network. All such embodiments are envisioned. For example, the free space estimation system 202 can comprise a server device, computing device, general-purpose computer, special-purpose computer, tablet computing device, handheld device, server class computing machine and/or database, laptop computer, notebook computer, desktop computer, cell phone, smart phone, consumer appliance and/or instrumentation, industrial and/or commercial device, digital assistant, multimedia Internet enabled phone, multimedia players, and/or another type of device and/or computing device. Likewise, the free space estimation system 202 can be disposed and/or run at any suitable device, such as, but not limited to a server device, computing device, general-purpose computer, special-purpose computer, tablet computing device, handheld device, server class computing machine and/or database, laptop computer, notebook computer, desktop computer, cell phone, smart phone, consumer appliance and/or instrumentation, industrial and/or commercial device, digital assistant, multimedia Internet enabled phone, multimedia players, and/or another type of device and/or computing device.

The free space estimation system 202 can be associated with, such as accessible via, a cloud computing environment. For example, the free space estimation system 202 can be associated with a cloud computing environment 1102 described below with reference to illustration 1100 of FIG. 11.

Operation of the non-limiting system 200 and/or of the free space estimation system 202 is not limited to generation of a single polygon-shaped boundary, boundary fusion and/or global estimation. Rather, operation of the non-limiting system 200 and/or of the free space estimation system 202 can be scalable. For example, the non-limiting system 200 and/or the free space estimation system 202 can enable plural process executions of one or more of the above-listed types at least partially in parallel with one another.

In one or more embodiments, the object can comprise the free space estimation system 202. In one or more other embodiments, the free space estimation system 202 can be separate from the object but can obtain measurements from one or more sensors at the object.

As illustrated the free space estimation system 202 can comprise a sensing sub-system 212 comprising one or more camera sensor 250 and one or more ultrasonic sensor (USS) 252, an obtaining component 214, a covariance component 216, a generation component 220, an execution component 222, a training component 224, analytical models 218-A, 218-B and/or 218-C, a processor 206, a memory 204, and/or a bus 205.

One or more communications between one or more components of the non-limiting system 200 and/or free space estimation system 202 can be provided by wired and/or wireless means including, but not limited to, employing a cellular network, a wide area network (WAN) (e.g., the Internet), and/or a local area network (LAN). Suitable wired or wireless technologies for providing the communications can include, without being limited to, wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra-mobile broadband (UMB), high speed packet access (HSPA), Zigbee and other 802.XX wireless technologies and/or legacy telecommunication technologies, BLUETOOTH®, Session Initiation Protocol (SIP), ZIGBEE®, RF4CE protocol, WirelessHART protocol, 6LoWPAN (Ipv6 over Low power Wireless Area Networks), Z-Wave, an ANT, an ultra-wideband (UWB) standard protocol, and/or other proprietary and/or non-proprietary communication protocols.

Discussion now turns to the processor 206, memory 204 and bus 205 of the free space estimation system 202.

For example, in one or more embodiments, the free space estimation system 202 can comprise a processor 206 (e.g., computer processing unit, microprocessor, classical processor, and/or like processor). In one or more embodiments, a component associated with the free space estimation system 202, as described herein with or without reference to the one or more figures of the one or more embodiments, can comprise one or more computer and/or machine readable, writable, and/or executable components and/or instructions that can be executed by processor 206 to provide performance of one or more processes defined by such component(s) and/or instruction(s). In one or more embodiments, the processor 206 can comprise the sensing sub-system 212, obtaining component 214, covariance component 216, generation component 220, execution component 222, training component 224 and/or analytical models 218-A, 218-B and/or 218-C.

In one or more embodiments, the free space estimation system 202 can comprise a computer-readable memory 204 that can be operably connected to the processor 206. The memory 204 can store computer-executable instructions that, upon execution by the processor 206, can cause the processor 206 and/or one or more other components of the free space estimation system 202 (e.g., the sensing sub-system 212, obtaining component 214, covariance component 216, generation component 220, execution component 222, training component 224 and/or analytical models 218-A, 218-B and/or 218-C) to perform one or more actions. In one or more embodiments, the memory 204 can store computer-executable components (e.g., the sensing sub-system 212, obtaining component 214, covariance component 216, generation component 220, execution component 222, training component 224 and/or analytical models 218-A, 218-B and/or 218-C).

The free space estimation system 202 and/or a component thereof as described herein, can be communicatively, electrically, operatively, optically, and/or otherwise coupled to one another via a bus 205 to perform functions of non-limiting system 420, free space estimation system 202 and/or one or more components thereof and/or coupled therewith. Bus 205 can comprise one or more of a memory bus, memory controller, peripheral bus, external bus, local bus, and/or another type of bus that can employ one or more bus architectures. One or more of these examples of bus 205 can be employed to implement one or more embodiments described herein.

In one or more embodiments, free space estimation system 202 can be coupled (e.g., communicatively, electrically, operatively, optically, and/or like function) to one or more external systems (e.g., a non-illustrated electrical output production system, one or more output targets, an output target controller, and/or the like), sources and/or devices (e.g., computing devices, communication devices, and/or like devices), such as via a network. In one or more embodiments, one or more of the components of the free space estimation system 202 can reside in the cloud, and/or can reside locally in a local computing environment (e.g., at a specified location(s)).

It is noted that in one or more embodiments, a portion or more of the sensing sub-system 212 and/or one or more analytical models 218 can be separate from, and thus external to, the free space estimation system 202. In one or more embodiments, the auxiliary sensor(s) 254 can be comprised by the free space estimation system 202.

In addition to the processor 206 and/or memory 204 described above, free space estimation system 202 can comprise one or more computer and/or machine readable, writable, and/or executable components and/or instructions that, when executed by processor 206, can provide performance of one or more operations defined by such component(s) and/or instruction(s).

Turning now first to the sensing sub-system 212, one or more sensors can be comprised by the free space estimation system 202. For example, the sensing sub-system 212 can comprise one or more camera sensors 250 and/or one or more ultrasonic sensors 252. Relative to the object being a vehicle, the camera sensors 250 and ultrasonic sensors 252 can be located at any suitable location on the vehicle. For example, turning briefly to FIG. 3, camera sensors 250 can be disposed at forward and rear locations of the vehicle 320. Turning briefly to FIG. 4, the ultrasonic sensors 252 likewise can be disposed at forward and rear locations of the vehicle 320.

Any suitable number of camera sensors 250 and any suitable number of ultrasonic sensors 252 can be employed at an object to provide sensing of distances of obstacles 182 from the object, e.g., from the vantage of the object. Alternative and/or additional locations can be employed where suitable. Spacing between the camera sensors 250, between the ultrasonic sensors 252, and/or between camera sensors 250 and ultrasonic sensors 252 can be equidistant, non-equidistant and/or as suitable for accurate imaging of the environment 180 about the object. Any suitable number of camera sensors 250 and/or ultrasonic sensors 252 can be positioned at the vehicle 320 (e.g., the object) and/or employed by the free space estimation system 202.

In one or more other embodiments, any one or more of the camera sensors 150 or ultrasonic sensors 252 can be separate from, such as external to, the free space estimation system 202.

Referring still to FIG. 2 any suitable number of auxiliary sensors 254 can be comprised by the object. The auxiliary sensors can comprise weather, moisture, precipitation, GPS, steering wheel angle, wheel speed, axle, and/or inertial measurement unit (IMU) sensor(s). One or more of these sensors can output data and/or measurement(s) about a property/variable of movement or environment of the object, which data and/or measurement(s) (e.g. auxiliary measurement) can be employed to generate a global estimation.

In one or more other embodiments, any one or more of the auxiliary sensors 254 can be comprised by the free space estimation system 202.

Turning next to the obtaining component 210, the obtaining component 210 can locate, find, search, and/or otherwise obtain measurement data such as raw data for employment by the free space estimation system 202 in estimating the free space about the object (e.g., the global estimation). For example, the obtaining component 210 can gather raw data from one or more camera sensors 250, one or more ultrasonic sensors 252 and/or one or more auxiliary sensors 254.

In one or more embodiments, the obtaining component 210 can further gather a historical global estimation, such as one previously output by the generation component 220, for use by the generation component 220 in generating a new global estimation.

Figure 3:
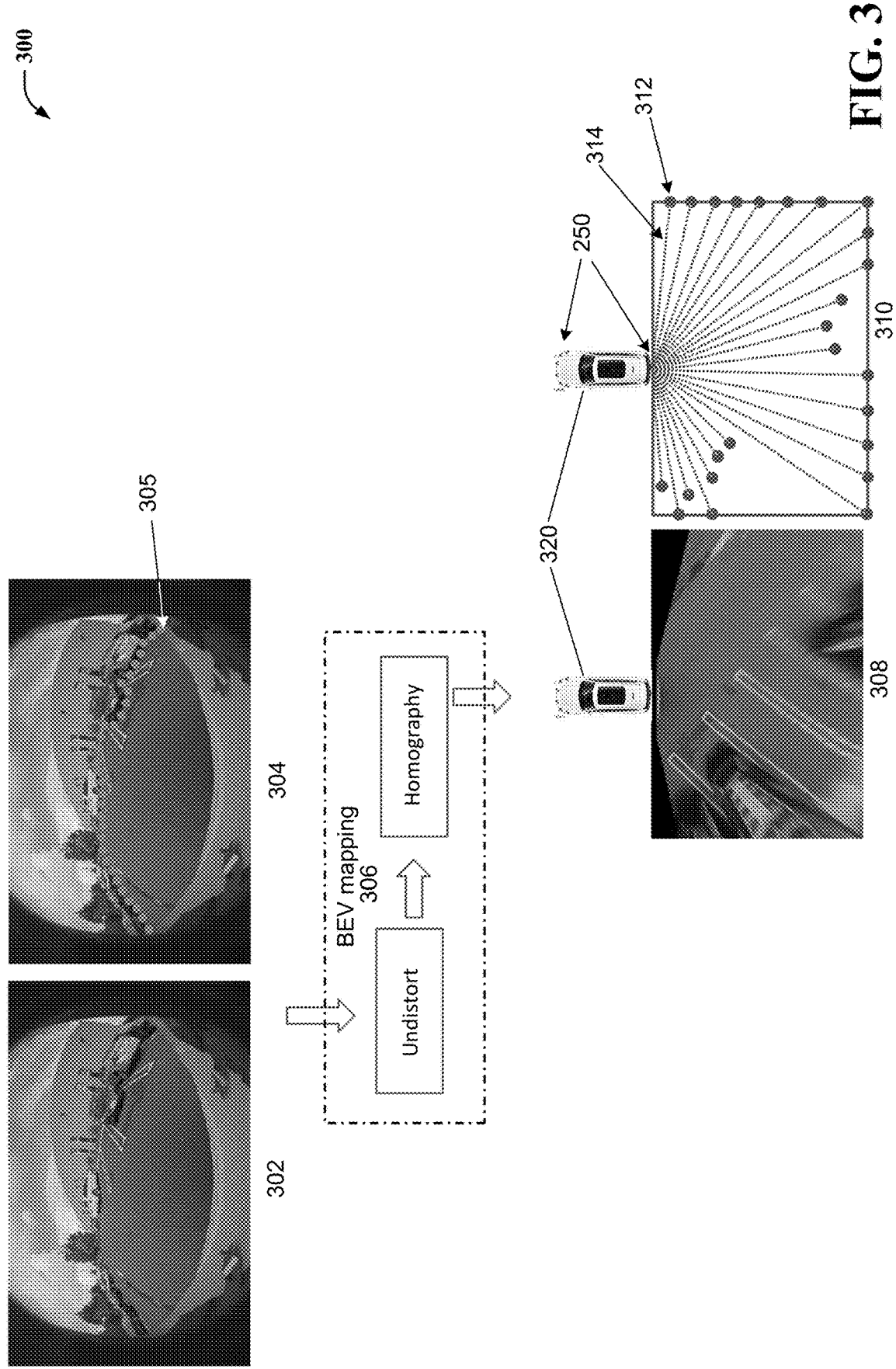
FIG. 3 provides a representation of camera sensor output as can be enabled by the free space estimation system of FIG. 2, in accordance with one or more embodiments described herein.
Figure 4:
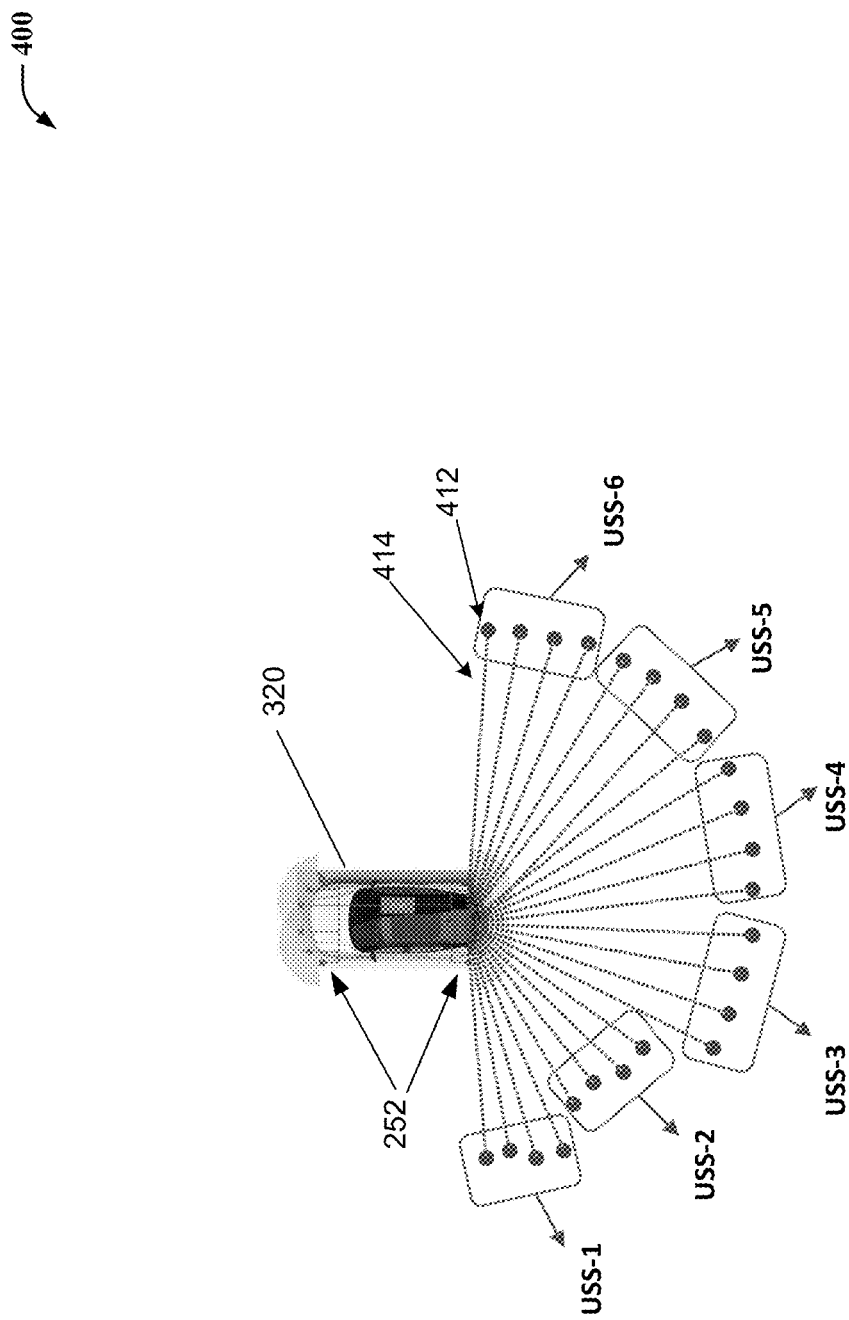
FIG. 4 provides a representation of ultrasonic sensor output as can be enabled by the free space estimation system of FIG. 2, in accordance with one or more embodiments described herein.
Figure 5:
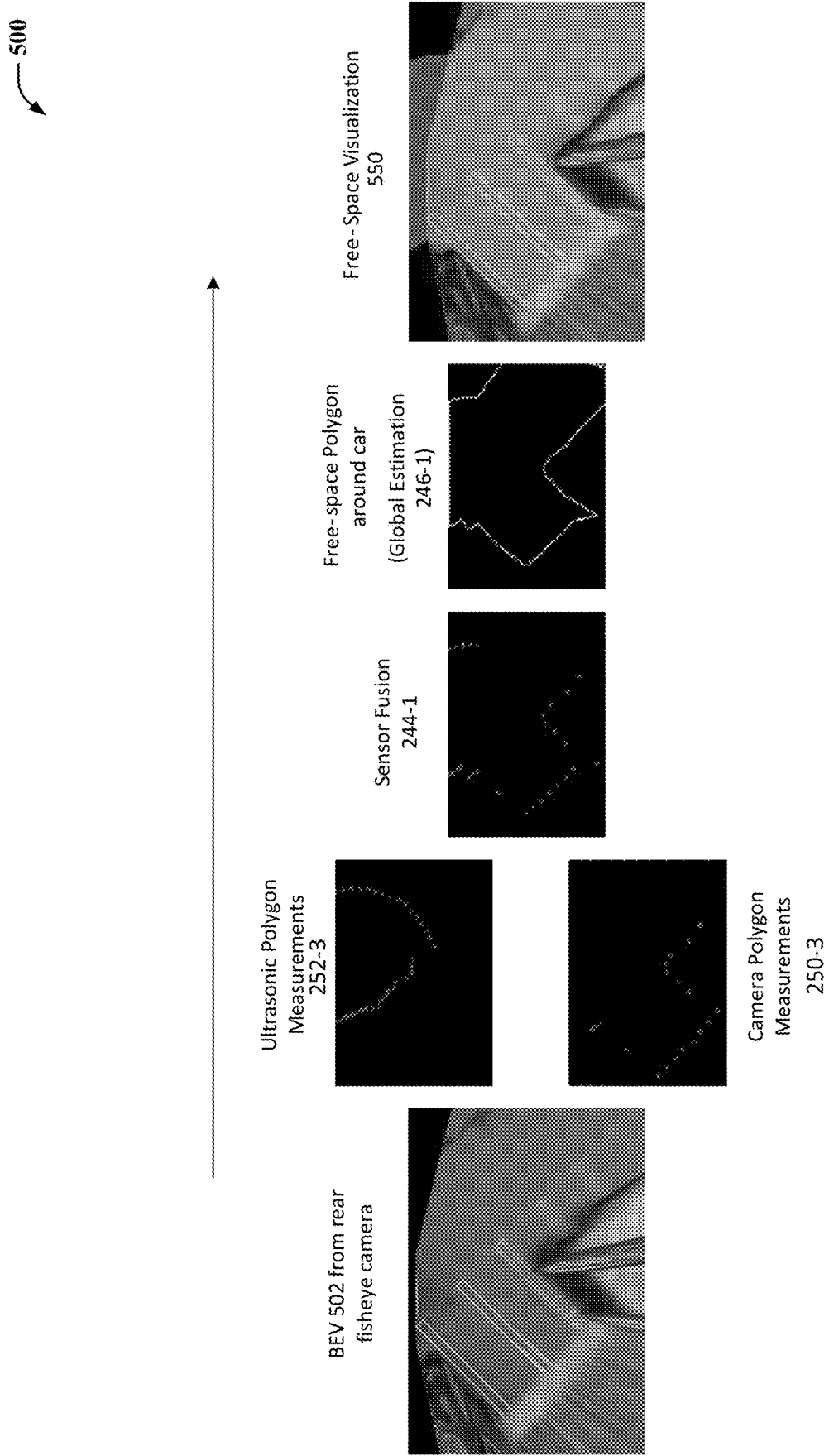
FIG. 5 provides a representation of combination of camera sensor output and ultrasonic sensor output as can be enabled by the free space estimation system of FIG. 2, in accordance with one or more embodiments described herein.

Attention now turns to FIGS. 3 to 5 away from FIG. 2. It is noted that description of the covariance component 216, analytical models 218-A, 218-B, 218-C, and generation component 220 will be provided below with additional reference also to FIGS. 6 and 7.

Turning first to FIG. 3, a set of depictions illustrate one or more processes performed by and/or relative to the one or more camera sensors 250. At 302 a raw view is illustrated as can be visualized by a camera sensor 250 at the respective object (e.g., a drivable vehicle). Generally, at 304, a plurality of raw vertices 305 are depicted as being overlayed onto the visualization by the camera sensor 250, such as enabled by an associated analytical model 218A. It is noted that the depiction 304 can be provided by the free space estimation system 202, and/or the depiction 304 can be virtual and/or unseen.

From the set of raw vertices 305 and the camera sensor image, birds' eye view (BEV) mapping can occur at 306. The BEV mapping can comprise an un-distortion (e.g., distortion smoothing) process and a homography process. As used herein, homography can refer to a class of projective geometry, where a view or image is transformed from one plane of view to another. That is, the BEV 308 can result as a composition of BEV coordinates based on the geometric transformation of the homography, such as performed by the analytical model 218-A. At the virtual BEV depiction 310, the raw vertices 305 from the camera sensor 250 can be projected onto a plane that is generally parallel to a resting surface of the object, thus allowing for uniformity/correspondence of the raw vertices relative to one another. In view of this transformation, the vertices 312 and vertex distances 314 can be generated as part of the virtual BEV depiction 310. The set of vertices 312 can denote an obstacle-free, polygon-shaped region at distances from the object at each vertex direction having a respective vertex distance 314.

It is noted that the camera sensor 250 can comprise and/or be communicatively coupled to a processor, generator and/or other component for performing the one or more projection processes described relative to depictions 302-310.

The camera sensor 250 can be communicatively coupled to an analytical model, such as the analytical model 218-A. Generally, the analytical model 218-A can enable generation of the series of vertex distances 314 and vertices 312 based on the camera image 302. In one or more embodiments, the analytical model 218-A can thus also enable and or perform the homography transformation.

For example, based on the raw data of the raw image 302, the analytical model 218-A can generate the raw vertices 305. Based on the raw vertices 305 and the raw image 302, the analytical model 318-A can generally conduct a homographic transformation to provide the planar projection 310, where the vertices 312 can be represented by pixel coordinates (e.g., row_index, column_index), such as predicted by the analytical model 218-A. The vertices 312 can be predicted to bound the free space between the object and any determined obstacles represented by the vertices 312. Likewise, the analytical model 218-A can generate and/or predict the respective vertex distances 314 (between the object and the respective vertices 312) based on the transformed image 308 and on the vertices 312.

The analytical model 218-A can be, can comprise and/or can be comprised by a classical model, such as a predictive model, neural network, and/or artificial intelligent model. An artificial intelligent model and/or neural network (e.g., a convolutional network and/or deep neural network) can comprise and/or employ artificial intelligence (AI), machine learning (ML), and/or deep learning (DL), where the learning can be supervised, semi-supervised and/or unsupervised. For example, the analytical model 218-A can comprise a deep neural network (DNN).

Generally, the analytical model 218-A can be trained, such as by the training component 224, on a set of training data that can represent the type of data for which the system will be used. That is, the analytical model 218-A can be trained on object and/or obstacle detection contrasted to free space relative to different types of camera images, BEVs and/or the like. Based on learned patterns, images, objects and/or obstacles, the analytical model 218-A can provide transformation of data between view planes and can generate/predict the vertices 312 and the vertex distances 314 based on the raw view (e.g., depiction 302) and transformed view (e.g., projection 308).

Figure 7:
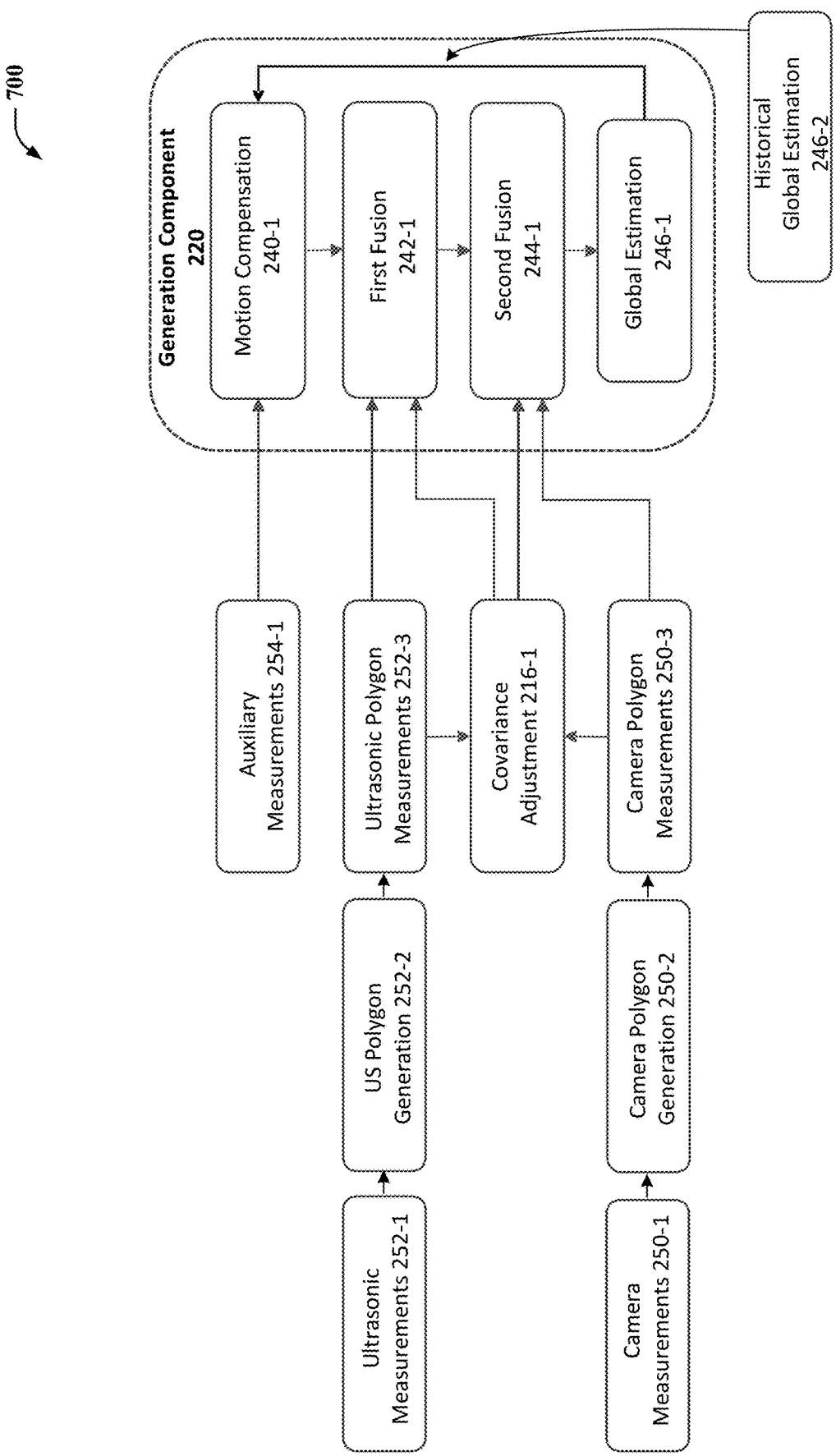
FIG. 7 provides an exemplary block diagram of one or more results and/or outputs relative to the one or more elements and/or operations illustrated at FIG. 6, in accordance with one or more embodiments described herein.

Referring additionally to FIG. 7, the analytical model 218-A can predict a camera polygon defined by camera polygon measurements 250-3 by performing a camera polygon generation 250-2. The camera polygon measurements 250-3 can be based on the vertices 312 and vertex distances 314 of the camera measurements 250-1. The camera polygon can be comprised by the set of vertices 312 denoting the obstacle-free region distances 314 at each vertex direction.

Connection of the vertices, whether actually or virtually performed, can then result in the camera polygon. For example, the analytical model 218-A can determine sets of vertices 312 and determine the respective distances 314 based on the vertices 312 of a set, such as based on a maximum allowable distance from the object for each vertex 312, error threshold and/or the like. The distances 314 and paired vertices 312 can define a part or all of a respective camera polygon. Where a vertex 312/distance 314 does not meet the applicable threshold, the analytical model 218-A can define a new vertex 312 and a respective distance 314, such as based on allowable limits and/or thresholds, and/or based on previous detection results, such as employing a historical global estimation 246-2.

It is noted that the camera polygon generation can be lightweight in that a defined number of directions/vertices 314/312 can be implemented. The number can be selected by an administrating entity and/or by the processor 206 and/or analytical model 218-A. The distances between the vertices can be equidistant and/or non-equidistant from one another about the object. For example, 30-36 directions can be spaced apart from one another about a full 360 degree boundary of the object.

The camera polygon measurements 250-3 can subsequently be employed by the generation component 220, such as to fuse the camera polygon measurements 250-3 with one or more other measurements to generate a respective global estimation 246-1 defining an accurate and lightweight estimation of free space about the object, from the vantage of the object. The additional steps will be discussed below relative to FIGS. 6 and 7.

But first, referring next to FIG. 4, a depiction 400 illustrates one or more processes performed by and/or relative to the one or more US sensors 252.

As illustrated, the object (e.g., drivable vehicle 320) can comprise a plurality of US sensors 252.

From raw data provided by the US sensors 252, such as including one or more echoes, one or more vertices 412 and/or vertex distances 414 can be determined. Similar to the camera sensors 250, the one or more vertices 412 and vertex distances 414 can be determined on a BEV plane by a suitable analytical model, such as the analytical model 218-B. That is, one or more processes of echo processing and remapping can be performed to transform the raw data from the USS 252 to the one or more vertices 412 and respective distances 414. The US plane can be generally parallel to a resting surface of the object, thus allowing for uniformity/correspondence of the vertex distances 414 relative to one another. The set of vertices 412 can denote an obstacle-free region at distances from the object at each vertex direction having a respective vertex distance 414.

It is noted that a US sensor 252 can comprise and/or be communicatively coupled to a processor, generator and/or other component for performing the one or more projection processes described relative to depiction 400.

The US sensor 252 can be communicatively coupled to an analytical model, such as the analytical model 218-B. Generally, the analytical model 218-B can provide generation of the series of vertex distances 414 and vertices 412 based on the raw echo data and/or other raw data from the US sensor 252. In one or more embodiments, the analytical model 218-B can thus also provide and/or perform a respective homography transformation.

For example, the vertices 412 can be predicted to bound the free space between the object and any determined obstacles represented by the vertices 412. Likewise, the analytical model 218-B can generate and/or predict the respective vertex distances 414 based on the vertices 412.

The analytical model 218-B can be, can comprise and/or can be comprised by a classical model, such as a predictive model, neural network, and/or artificial intelligent model. An artificial intelligent model and/or neural network (e.g., a convolutional network and/or deep neural network) can comprise and/or employ artificial intelligence (AI), machine learning (ML), and/or deep learning (DL), where the learning can be supervised, semi-supervised and/or unsupervised. For example, the analytical model 218-B can comprise a deep neural network (DNN).

Generally, the analytical model 218-B can be trained, such as by the training component 224, on a set of training data that can represent the type of data for which the system will be used. That is, the analytical model 218-B can be trained on object and/or obstacle detection contrasted to free space relative to different types of ultrasonic (US) data and/or the like. Based on learned patterns, images, objects and/or obstacles, the analytical model 218-B can provide transformation of data between view planes and can generate/predict the vertices 412 and the vertex distances 414 based off the raw US data and transformed (e.g., projected) data.

Referring additionally to FIG. 7, the analytical model 218-B can predict a US polygon defined by US polygon measurements 252-3 by performing a US polygon generation 252-2. The US polygon measurements 252-3 can be based on the vertices 412 and vertex distances 414 of the US measurements 252-1. The US polygon can be comprised by the set of vertices 412 denoting the obstacle-free region distances 414 at each vertex direction.

Connection of the vertices, whether actually or virtually performed, can then result in the camera polygon. For example, the analytical model 218-B can determine sets of vertices 412 and determine a line based on the vertices 312 of a set, such as based on a maximum allowable distance from the line, error threshold and/or the like. The line can define one side of the whole or partial US polygon. Where a vertex 412 does not meet the applicable threshold, the vertex 412 can be assigned to a different set of vertices 412 by the analytical model 218-B.

Connection of the vertices, whether actually or virtually performed, can then result in the US polygon. For example, the analytical model 218-B can determine sets of vertices 412 and determine the respective distances 414 based on the vertices 412 of a set, such as based on a maximum allowable distance from the object for each vertex 412, error threshold and/or the like. The distances 414 and paired vertices 412 can define a part or all of a respective US polygon. Where a vertex 412/distance 414 does not meet the applicable threshold, the analytical model 218-B can define a new vertex 412 and a respective distance 414, such as based on allowable limits and/or thresholds, and/or based on previous detection results, such as employing a historical global estimation 246-2.

It is noted that the US polygon generation 252-2 can be lightweight, like the camera polygon generation 250-2, in that a defined number of directions/vertices 414/412 can be implemented. The number can be selected by an administrating entity and/or by the processor 206 and/or analytical model 218-B. The distances between the vertices can be equidistant and/or non-equidistant from one another about the object. For example, 30-36 directions can be spaced apart from one another about a full 360 degree boundary of the object. A different or same number of directions can be employed for the US sensor(s) 252 as compared to a number of directions employed for the camera sensor(s) 250.

The US polygon measurements 252-3 can subsequently be employed by the generation component 220, such as to fuse the US polygon measurements 252-3 with one or more other measurements, such as with the camera polygon measurements 250-3, to generate a respective global estimation 246-1 defining an accurate and lightweight estimation of free space about the object, from the vantage of the object. The additional steps will be discussed below relative to FIGS. 6 and 7.

Looking now to FIG. 5, an additional general progression 500 is depicted to illustrate the fusion of raw images from the sensors of the sensor sub-system 212 to provide a free-space visualization 550, defined by the global estimation 246-1. As depicted, a BEV 502 from a camera sensor 250, such as a fisheye camera, and an US echo/data can be precursors for separate camera polygon measurements 250-3 and ultrasonic polygon measurements 252-3. It is appreciated that US detection can be more accurate at shorter distances from the respective US sensor, while camera detection can be more accurate at farther distances from the respective camera sensor. For example, in one or more embodiments, ultrasonic accuracy can be good within 3 m, but at a distance 3 m-5 m, noise can increase. Beyond 5 m can be beyond ultrasonic range.

A sensor fusion 244-1 can generally be performed, such as by the generation component 220, to combine the separate polygon measurements. From a result of the sensor fusion 244-1, the global estimation 246-1 can be determined by the generation component 220. The global estimation 246-1 can define the free-space polygon (e.g., resultant virtual polygon) around the object (e.g., drivable vehicle, such as a car). A free-space visualization 550 can generally result therefrom, which free-space visualization 550 is bounded by the virtual polygon of the global estimation 246-1.

Figure 6:
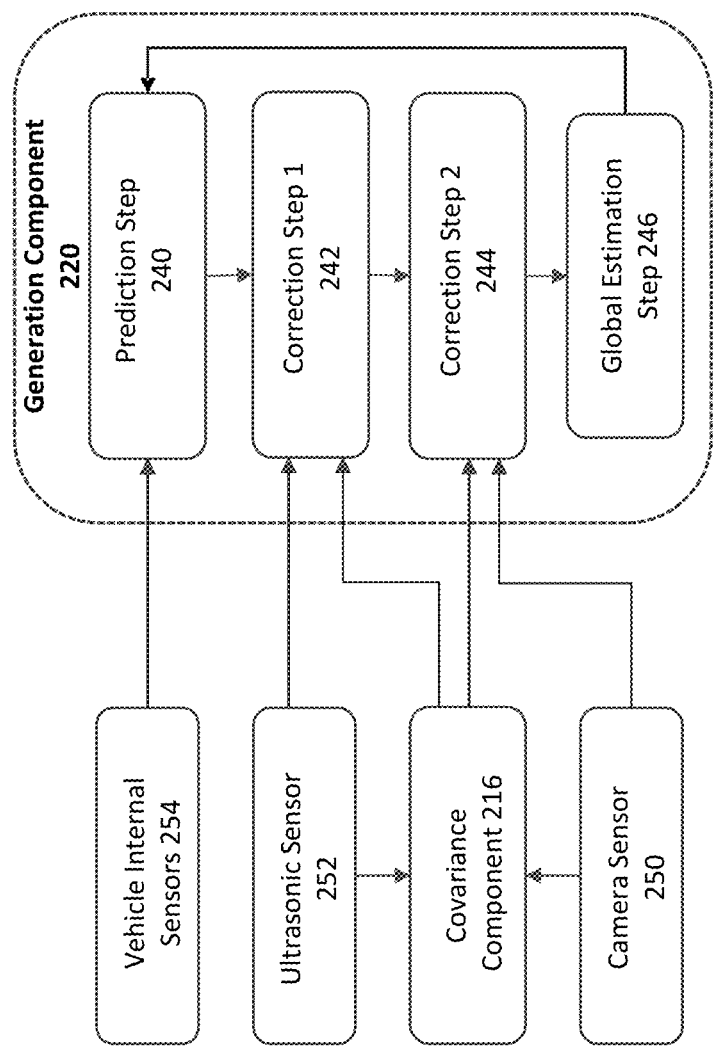
FIG. 6 provides an exemplary block diagram of one or more elements of and/or operations that can be performed by the free space estimation system of FIG. 2, in accordance with one or more embodiments described herein.

Turning now to FIGS. 6 and 7, detail regarding process flow from sensor output to provision of global estimation will be detailed, including detail of function of the covariance component 216, analytical models 218-A, 218-B, 218-C, and generation component 220.

FIG. 6 illustrates an exemplary block diagram 600 of one or more elements of and/or operations that can be performed by the free space estimation system 202 of FIG. 2, in accordance with one or more embodiments described herein. As illustrated, outputs of the ultrasonic sensor(s) 252 and camera sensor(s) 250 can be input to and/or otherwise obtained by the covariance component 216. The covariance component 216 can generally be a dynamic noise covariance generator to adjust noise covariance values separately for ultrasonic and camera polygon directions, such as based on the measured respective distances 314 and 442. For example, a maximum measurement range of the camera sensors 250 and of the ultrasonic sensors 252 can be different. The measurement noise level can change with detected distance.

The covariance component 216 can employ an analytical model, such as the analytical model 218-C. The analytical model 218-C can be, can comprise and/or can be comprised by a classical model, such as a predictive model, neural network, and/or artificial intelligent model. An artificial intelligent model and/or neural network (e.g., a convolutional network and/or deep neural network) can comprise and/or employ artificial intelligence (AI), machine learning (ML), and/or deep learning (DL), where the learning can be supervised, semi-supervised and/or unsupervised. For example, the analytical model 218-C can comprise a deep neural network (DNN).

Generally, the analytical model 218-C can be trained, such as by the training component 224, on a set of training data that can represent the type of data for which the system will be used. That is, the analytical model 218-C can be trained on noise detection and classification data, measurements and/or the like.

More particularly, the covariance component 216 can adjust one or more measurements, such as the camera polygon measurements 250-3 and US polygon measurements 252-3, relative to one another based on detected noise, such as system noise, noise caused by weather conditions, noise caused by environmental conditions and/or the like. The covariance component 216, in combination with the analytical model 218-C, can detect the noise.

After detection of the noise, the noise can be classified by the analytical model 218-C and adjustment of the measurements 250-3 and 252-3 can be performed. For example, a system of weighting can be employed by the analytical model 218-C, such as based on severity of system noise. In order to enable a robust pose estimation, the one or more measurements 250-3 and 252-3 can be adjusted to have less or more significance to the overall virtual polygon generation.

In one or more embodiments, weights can be based on historical information and/or weather information. In one or more additional and/or alternative embodiments, weights can be based on broken or malfunctioning sensor state, or even on weather-based sensor failure. For example, snow, fog and/or heavy rain can limit accurate measurements of a sensor of the sensor sub-system 212.

As illustrated, one or more outputs of auxiliary vehicle internal sensors 254, ultrasonic sensors 252, camera sensors 250 and the covariance component 216 can be input to and/or otherwise obtained by the generation component 220. That is, the weighted polygon measurements 250-3 and 252-3 can be input to and/or otherwise obtained by the generation component 220.

The generation component 220 can generally be provided by and/or comprise, at least partially, a filter, such as a Kalman filter or sequential Kalman filter. A sequential Kalman Filter can be configured, such as designed, to fuse measurements from different sensor types for each fusion cycle (e.g., iteration of use of the free space estimation system 202 and/or iteration of provision of a global estimation 246-1).

Description now turns to FIG. 7 in addition to FIG. 6. FIG. 7 illustrates is an exemplary block diagram of one or more results and/or outputs relative to the one or more elements and/or operations illustrated at FIG. 6, in accordance with one or more embodiments described herein.

The generation component 220 can perform one or more processes to generate the global estimation 246-1 from the weighted camera polygon measurements 250-3 and US polygon measurements 252-3, and from the auxiliary measurements 254-1 and/or historical global estimation 246-2. Generally, the generation component 220 can, based on the measurements, generate a dimension, portion and/or more of a virtual polygon representing a boundary about the object, where the virtual polygon can be based on a combination of measurements from different sensor types.

Briefly, the generation component 220 can perform a prediction step 240, first correction step 242, second correction step 244 and global estimation step 246. In one or more embodiments, the correction steps 242 and 244 can be reversed.

For the prediction step 240, vehicle internal sensor readings (e.g., auxiliary measurement data 254-1) and the fused free-space polygon from the previous cycle (e.g., historical global estimation 246-2) can be fed to a motion compensation module, where a motion compensation 240-1 can be performed by the generation component 220. The previously fused free-space information (e.g., historical global estimation 246-2) can be projected to the current cycle based on the vehicle movements (e.g., auxiliary measurement data 254-1).

Next, at the first correction step 242, a first fusion 242-1 can be performed by the generation component. The first fusion 242-1 can comprise fusing of the motion compensation 240-1 result with the ultrasonic polygon measurements 252-3 that have been adjusted via the covariance adjustment 216-1 performed by the covariance component 216.

For example, distance information of the polygon vertices can be updated according to the motion-compensated polygon and the ultrasonic polygon measurements. For each polygon vertex direction, the appropriate distance can be calculated based on a weighted average of the vertex distance from motion-compensated polygon and the ultrasonic measurement polygon. The weights can be decided dynamically by the covariance component 216 at run time, based on the current and previous measurements.

Next at a second correction step 244, a second fusion 244-1 can be performed. The second fusion 244-1 can comprise fusing of the first fusion 242-1 result with the camera polygon measurements 250-3 that have been adjusted via the covariance adjustment 216-1 performed by the covariance component 216.

For example, distance information of the polygon vertices can be updated according to the first fused polygon and the camera polygon measurements. For each polygon vertex direction, the appropriate distance will be calculated based on a weighted average of the vertex distance from the first fused polygon and the camera measurement polygon. The weights can be decided dynamically by the covariance component 216 at run time, based on the current and previous measurements.

In one or more embodiments, the first fusion 242-1 can be performed prior to the second fusion 244-1.

Next at a global estimation step 246, the global estimation 246-1 can be provided from the second fusion 244-1. In one or more embodiments, the result of the second fusion 244-1 can be further processed to achieve the global estimation 246-1. In one or more embodiments, the result of the second fusion 244-1 can be the global estimation 246-1.

The global estimation from the Kalman Filter can be output as the overall estimated free-space polygon (e.g., virtual polygon)around the car. The virtual polygon can be comprised by one or more vectors defined by a set of vertices denoting the obstacle-free region distances at each vertex direction (e.g., comprising paired polygon vertex directions and polygon vertex distances).

That is, as a summary of the above-described correction steps 242 to 246, the generation component 220 can generate first polygon measurements from first raw measurements from an ultrasonic sensor (e.g., via the first fusion 242-1) and second polygon measurements from second raw measurements from a camera (e.g., via the second fusion 244-1). In one or more embodiments, the first and second fusions can be performed in reverse order. That is, the virtual polygon (e.g., final merged polygon) of the global estimation 246-1 can be based on a combination of the first polygon measurements and the second polygon measurements.

Referring now again to FIG. 2, after generation of the global estimation 246-1 by the generation component 220, the execution component 222 can recommend a movement value to control movement of the object based on the virtual polygon/global estimation 246-1. Alternatively, the execution component 222 can control movement of the object based on the virtual polygon. For example, the execution component 222 can transmit the global estimation 246-1 to a controller of object movement, such as a trajectory planning module for autonomous driving, thereby controlling movement of the object by limiting and/or defining available free space.

Referring still to FIG. 2, in one or more embodiments, the free space estimation system 202 can comprise a training component 224. The training component 224 can train one or more of the analytical models 218-A, 218-B and/or 218-C based on various data/access/use/behavior associated with the sensing sub-system 212 and/or covariance component 216, such as based on historical data defining noise, obstacles, environmental aspects and/or the like. In one or more cases, such historical data can be stored at the memory 204 and/or at any other suitable store internal to and/or external to the free space estimation system 202. The training component 224 can execute the training at any suitable frequency, such as after each free space estimation process iteration, based on a selected timing, and/or on-demand.

Figure 8:
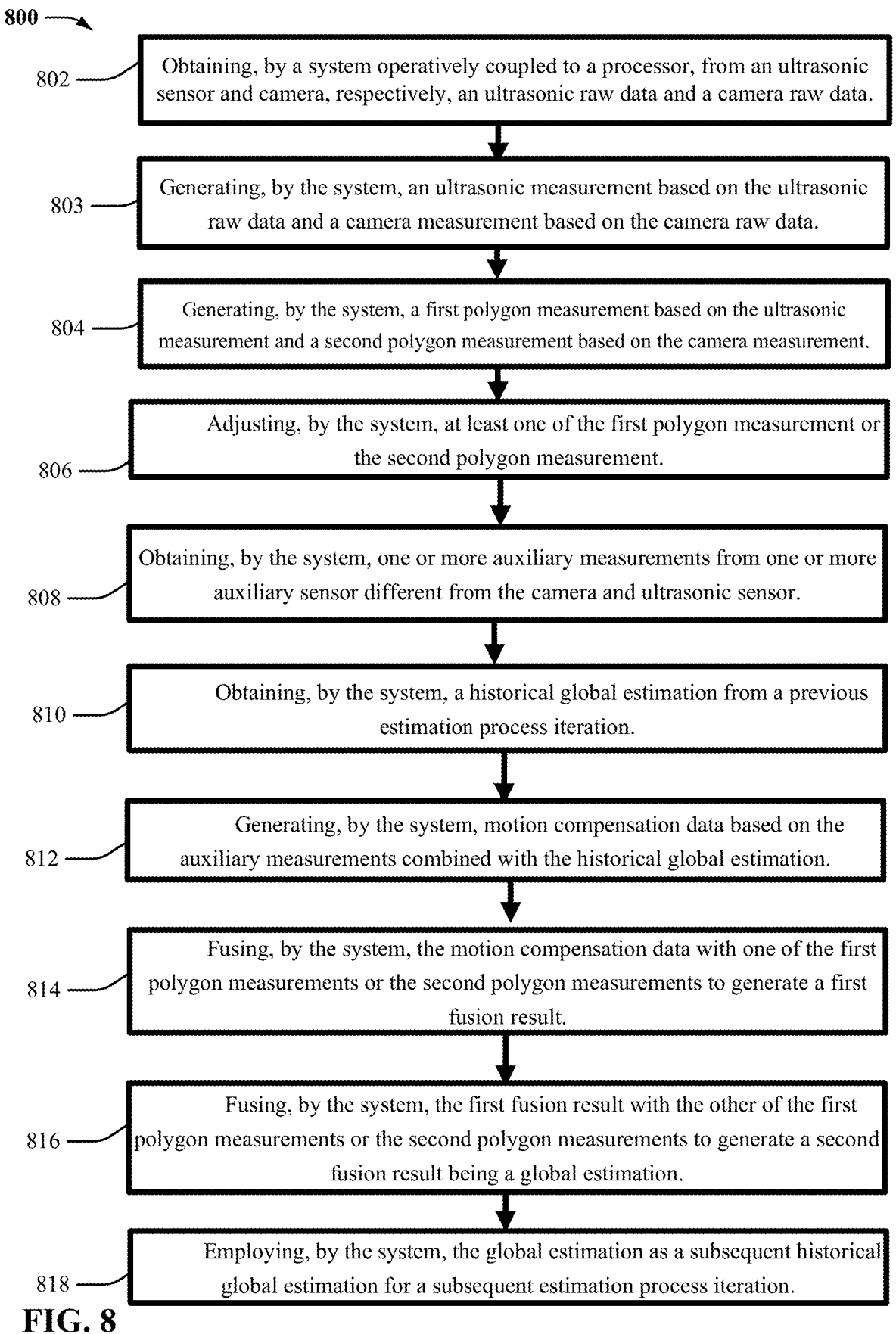
FIG. 8 illustrates a process flow of a method of determination of a global estimation of free space about an object, such as relative to the free space estimation system of FIG. 2 and the block diagrams of FIGS. 6 and 7, in accordance with one or more embodiments described herein.

Turning now to the next figure not yet discussed, to FIG. 8, illustrated is a flow diagram of an example, non-limiting computer-implemented method 800 that can enable a process to determine free space around an object, in accordance with one or more embodiments described herein. While the computer-implemented method 800 is described herein relative to the free space estimation system 202 of FIG. 2, and relative to the block diagrams 600 and 700, the computer-implemented method 800 likewise can be applicable to other embodiments, such as illustrated at FIG. 1. Repetitive description of like elements employed in one or more other embodiments described herein is omitted for sake of brevity.

At 802, the computer-implemented method 800 can comprise obtaining, by a system operatively coupled to a processor (e.g., obtaining component 214), from an ultrasonic sensor (e.g., ultrasonic sensor 252) and camera (e.g., camera sensor 250), respectively, an ultrasonic raw data and a camera raw data.

At 803, the computer-implemented method 800 can comprise generating, by the system (e.g., generation component 220), an US measurement (e.g., ultrasonic measurements 252-1) based on the ultrasonic raw data, and a camera measurement (e.g., camera measurements 250-1) based on the camera raw data.

At 804, the computer-implemented method 800 can comprise generating, by the system (e.g., generation component 220), a first polygon measurement (e.g., ultrasonic polygon measurements 252-3) based on the ultrasonic measurement (e.g., raw ultrasonic measurements 252-1), and a second polygon measurement (e.g., camera polygon measurements 250-3) based on the camera measurement (e.g., raw camera measurements 250-1).

At 806, the computer-implemented method 800 can comprise adjusting, by the system (e.g., covariance component 216), at least one of the first polygon measurement or the second polygon measurement.

At 808, the computer-implemented method 800 can comprise obtaining, by the system (e.g., obtaining component 214), one or more auxiliary measurement (e.g., auxiliary measurements 254-1) from one or more auxiliary sensor (e.g., auxiliary sensor 254) different from the camera (e.g., camera sensor 250) and ultrasonic sensor (e.g., US sensor 252).

At 810 the computer-implemented method 800 can comprise obtaining, by the system (e.g., obtaining component 214), a historical global estimation (e.g., historical global estimation 246-2) from a previous estimation process iteration.

At 812, the computer-implemented method 800 can comprise generating, by the system (e.g., generation component 220), motion compensation data (e.g., motion compensation data from motion compensation 240-1).

At 814, the computer-implemented method 800 can comprise fusing, by the system (e.g., generation component 220), the motion compensation data with one of the first polygon measurement (e.g., ultrasonic polygon measurements 252-3) or the second polygon measurement (e.g., camera polygon measurements 250-3) to generate a first fusion result (e.g., first fusion 242-1).

At 816, the computer-implemented method 800 can comprise fusing, by the system (e.g., generation component 220), the first fusion result (e.g., result of first fusion 242-1) with the other of the first polygon measurement (e.g., ultrasonic polygon measurements 252-3) or the second polygon measurement (e.g., camera polygon measurements 250-3) to generate a second fusion result (e.g., result of second fusion 244-1) being a global estimation (e.g., global estimation 246-1).

At 818, the computer-implemented method 800 can comprise employing, by the system (e.g., generation component 220), the global estimation (e.g., global estimation 246-1) as a subsequent historical global estimation (e.g., historical global estimation 246-2) for a subsequent estimation process iteration.

Figure 9:
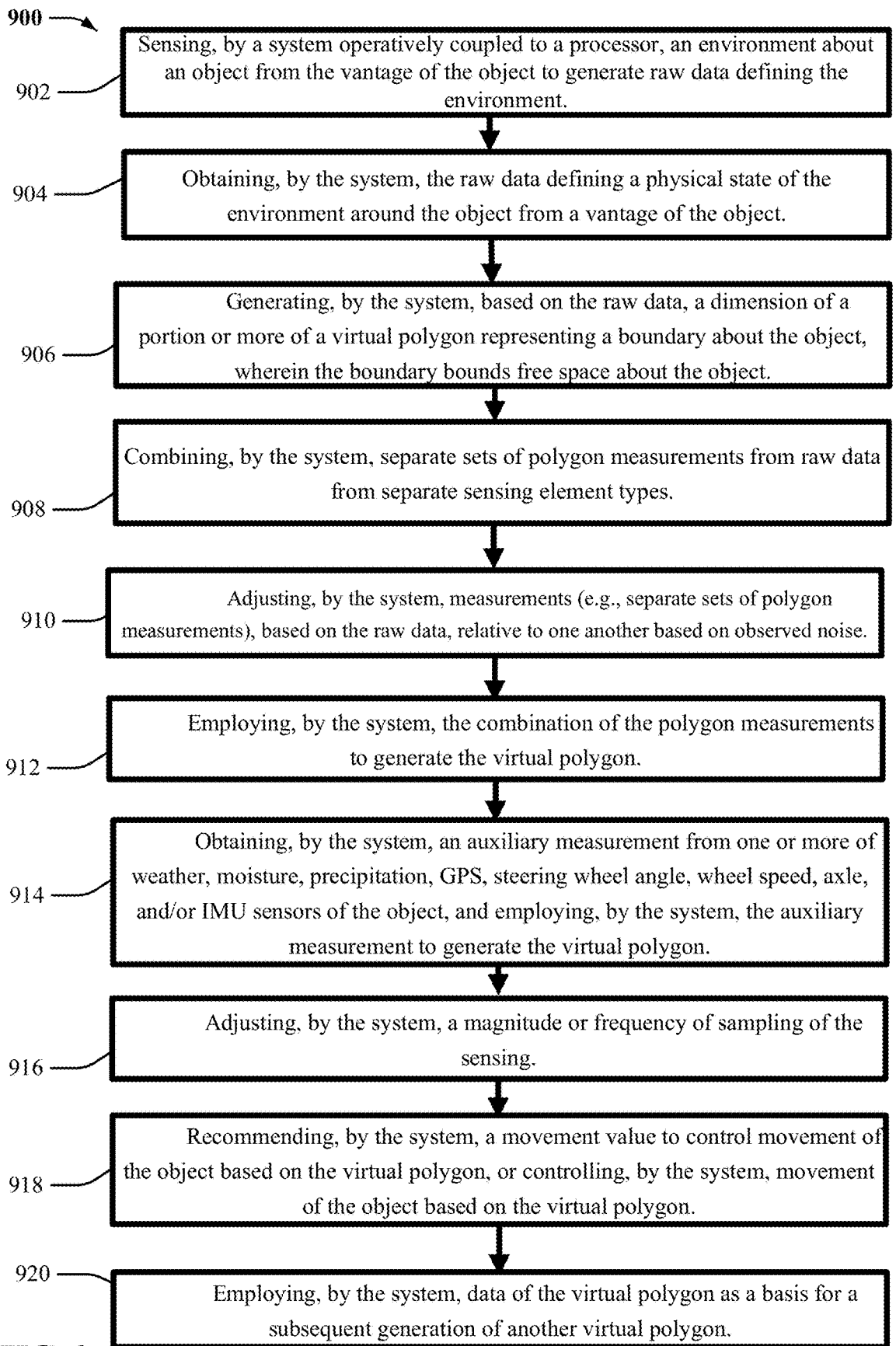
FIG. 9 illustrates another process flow of a method of determination of a global estimation of free space about an object, such as relative to the free space estimation system of FIG. 2, in accordance with one or more embodiments described herein.

Turning now to FIG. 9, illustrated is a flow diagram of an example, non-limiting computer-implemented method 900 that can enable a process to determine free space around an object, in accordance with one or more embodiments described herein. While the computer-implemented method 900 is described herein relative to the free space estimation system 202 of FIG. 2, and relative to the block diagrams 600 and 700, the computer-implemented method 900 likewise can be applicable to other embodiments, such as illustrated at FIG. 1. Repetitive description of like elements employed in one or more other embodiments described herein is omitted for sake of brevity.

At 902, the computer-implemented method 900 can comprise sensing, by a system operatively coupled to a processor (e.g., sensing sub-system 212), an environment (e.g., environment 180) about an object from the vantage of the object to generate measurements defining the environment.

At 904, the computer-implemented method 900 can comprise obtaining, by the system (e.g., obtaining component 214), raw data defining a physical state of the environment around the object from a vantage of the object.

At 906, the computer-implemented method 900 can comprise generating, by the system (e.g., generation component 220), based on the raw data, a dimension of a portion or more of a virtual polygon representing a boundary about the object, wherein the boundary bounds free space about the object.

At 908, the computer-implemented method 900 can comprise combining, by the system (e.g., generation component 220), separate sets of polygon measurements from raw data from separate sensing element types.

At 910, the computer-implemented method 900 can comprise adjusting, by the system (e.g., covariance component 216), the measurements (e.g., separate sets of polygon measurements) relative to one another based on observed noise.

At 912, the computer-implemented method 900 can comprise employing, by the system (e.g., generation component 220), the combination of the polygon measurements to generate the virtual polygon.

At 914, the computer-implemented method 900 can comprise obtaining, by the system (e.g., obtaining component 214), auxiliary measurements (e.g., auxiliary measurements 254-1) from one or more of weather, moisture, precipitation, GPS, steering wheel angle, wheel speed, axle, and/or inertial measurement unit (IMU) sensor (e.g., auxiliary sensor 254).

At 916, the computer-implemented method 900 can comprise adjusting, by the system (e.g., sensing sub-system 212), a magnitude or frequency of sampling of the sensing.

At 918, the computer-implemented method 900 can comprise recommending, by the system (e.g., execution component 222), a movement value to control movement of the object based on the virtual polygon, or controlling, by the system (e.g., execution component 222), movement of the object based on the virtual polygon.

At 920, the computer-implemented method 900 can comprise employing, by the system (e.g., generation component 220), data of the virtual polygon as a basis for a subsequent generation of another virtual polygon.

In summary, a lightweight free-space estimator (e.g., free space estimation system) describe herein can detect free-space for autonomous emergency braking applications in low-speed maneuvers. To achieve this detection, employed are one or more low-resolution ultrasonic sensors and one or more fisheye cameras to provide a high-efficient free-space estimation. The free-space information can be abstracted and/or represented by a set of polygon vertices. The proposed lightweight free-space estimator can be extremely responsive to a dynamically changing environment about an object employing the free-space estimator, such as an autonomously drivable vehicle. The proposed free-space estimator can enable an efficient instantaneous interaction of the entire autonomous emergency braking pipeline with the dynamically changing environment.

In further summary, one or more embodiments herein can enable identification of an obstacle free area about an object. An exemplary system can comprise a memory that stores computer executable components, and a processor that executes the computer executable components stored in the memory, wherein the computer executable components can comprise an obtaining component that obtains raw data defining a physical state of an environment around an object from a vantage of the object, and a generation component that, based on the raw data, generates a dimension of a portion or more of a virtual polygon representing a boundary about the object, wherein the boundary bounds free space about the object. A sensing sub-system can comprise both an ultrasonic sensor and a camera that can separately sense the environment about the object from the vantage of the object to thereby generate separate polygon measurement sets.

The one or more innovations, frameworks, systems, devices and/or methods described herein can be additionally, and/or alternatively described as follows:

A system, comprising a memory that stores computer executable components, and a processor that executes the computer executable components stored in the memory, wherein the computer executable components are characterized by an obtaining component that obtains raw data defining a physical state of an environment around an object from a vantage of the object, and a generation component that, based on the raw data, generates a dimension of a portion or more of a virtual polygon representing a boundary about the object, wherein the boundary bounds free space about the object.

The system, wherein the boundary extends vertically from a resting surface of the object.

The system of any previous paragraph, optionally comprising a sensing sub-system comprising both an ultrasonic sensor and a camera that sense the environment about the object from the vantage of the object to thereby generate the raw data.

The system of any previous paragraph, wherein the generation component generates first polygon measurements from first raw data from an ultrasonic sensor and second polygon measurements from second raw data from a camera, wherein the first and second raw data are comprised by the raw data, and wherein the virtual polygon is based on a combination of the first polygon measurements and the second polygon measurements.

The system of any previous paragraph, wherein the generation component combines separate sets of polygon measurements from separate sensing element types of the sensing sub-system, and wherein the combination is employed by the generation component to generate the virtual polygon.

The system of any previous paragraph, optionally comprising a covariance component that adjusts measurements, based on the raw data, relative to one another based on observed noise.

The system of any previous paragraph, optionally comprising an auxiliary sensing component that provides an auxiliary measurement from one or more of weather, moisture, precipitation, GPS, steering wheel angle, wheel speed, axle, or inertial measurement unit sensors of the object, wherein the auxiliary measurement is optionally employed by the system to generate the virtual polygon.

The system of any previous paragraph, optionally comprising an output component that recommends a movement value to control movement of the object based on the virtual polygon.

A computer-implemented method, characterized by obtaining, by a system operatively coupled to a processor, raw data defining a physical state of an environment around an object from a vantage of the object, and generating, by the system, based on the raw data, a dimension of a portion or more of a virtual polygon representing a boundary about the object, wherein the boundary bounds free space about the object.

The computer-implemented method, optionally comprising sensing, by both an ultrasonic sensor and a camera of the system, the environment about the object from the vantage of the object to thereby generate the raw data.

The computer-implemented method of any previous paragraph, wherein the sensing comprises optionally sensing at one or both of equidistant intervals about the object or non-equidistant intervals about the object.

The computer-implemented method of any previous paragraph, optionally comprising adjusting, by the system, a magnitude or frequency of sampling of the sensing.

The computer-implemented method of any previous paragraph, optionally comprising combining, by the system, separate sets of polygon measurements from raw data from separate sensing element types, and optionally employing, by the system, the combination of the polygon measurements to generate the virtual polygon.

The computer-implemented method of any previous paragraph, optionally comprising adjusting, by the system, measurements, based on the raw data, relative to one another based on observed noise.

The computer-implemented method of any previous paragraph, optionally comprising recommending, by the system, a movement value to control movement of the object based on the virtual polygon, or optionally controlling, by the system, movement of the object based on the virtual polygon.

An advantage of the device, system, computer-implemented method and/or computer program product discussed above can be a lightweight estimation process that can be employed rapidly relative to unforeseen, emergency and/or otherwise unintended changes in the environment about a moving vehicle. That is, the estimation process can comprise low memory consumption, restricted data vectors and/or reduced computation, such as compared to conventional approaches.

Another advantage of the device, system, computer-implemented method and/or computer program product discussed above can be an ability to obtain accurate measurements relative to an environment close to the object and relative to an environment further form the object. This can be enabled by use of both one or more camera sensors and one or more ultrasonic sensors.

Another advantage of the device, system, computer-implemented method and/or computer program product discussed above can be rapid provision of a recommendation or control for movement of the object, such as where the object is already in motion.

Yet another advantage of the device, system, computer-implemented method and/or computer program product discussed above can be employment of an artificial intelligence (AI) model, neural network (NN), machine learning (ML) model and/or deep learning (DL) model to generate polygon measurements defining a free space area about the object. Separate polygon measurements can be generated from raw data from each of one or more camera sensors and one or more ultrasound sensors, which polygon measurements can be combined and/or fused to provide an accurate and efficient global estimation of free space area about the object.

Furthermore, another advantage of the device, system, computer-implemented method and/or computer program product discussed above can be employing of an AI model, NN, ML model and/or DL model to balance the raw measurements from different sensors relative to one another, such as due to variance and/or error attributable to system noise, weather and/or the like.

Indeed, in view of the one or more embodiments described herein, a practical application of the systems, computer-implemented methods, and/or computer program products described herein can be an increase in accuracy and/or availability of free space data for use in situations of emergency, unintended actions and/or unforeseen occurrences relative to a moving object, such as a moving vehicle driving at least partially autonomously. Overall, such computerized tools can constitute a concrete and tangible technical improvement in the fields of autonomous driving systems and/or free space estimation systems, without being limited thereto.

One or more embodiments described herein can be inherently and/or inextricably tied to computer technology and cannot be implemented outside of a computing environment. For example, one or more processes performed by one or more embodiments described herein can more efficiently, and even more feasibly, provide program and/or program instruction execution, such as relative to free space estimation about an object, such as a moving object, as compared to existing systems and/or techniques lacking such approach(es). Systems, computer-implemented methods, and/or computer program products enabling performance of these processes are of great utility in the fields of autonomous driving systems and/or free space estimation systems and cannot be equally practically implemented in a sensible way outside of a computing environment.

One or more embodiments described herein can employ hardware and/or software to solve problems that are highly technical, that are not abstract, and that cannot be performed as a set of mental acts by a human. For example, a human, or even thousands of humans, cannot efficiently, accurately, and/or effectively electronically manage raw camera and/or ultrasonic sensor measurements to generate polygon measurements, and/or fuse such raw sensor measurements with one another and with auxiliary sensor data from a moving vehicle to generate a virtual free space estimation for use by an autonomous driving vehicle, as the one or more embodiments described herein can provide this process. Further, a human, or even thousands of humans, cannot efficiently, accurately, and/or effectively use an AI, NN, ML and/or DL model to generate polygon measurements and/or to balance such polygon measurements relative to system noise, as the one or more embodiments described herein can provide this process. And, neither can the human mind nor a human with pen and paper electronically effectively electronically achieve, provide and/or execute such processes, as conducted by one or more embodiments described herein.

In one or more embodiments, one or more of the processes and/or frameworks described herein can be performed by one or more specialized computers (e.g., a specialized processing unit, a specialized classical computer, and/or another type of specialized computer) to execute defined tasks related to the one or more technologies describe above. One or more embodiments described herein and/or components thereof can be employed to solve new problems that arise through advancements in technologies mentioned above, cloud computing systems, computer architecture, and/or another technology.

One or more embodiments described herein can be fully operational towards performing one or more other functions (e.g., fully powered on, fully executed and/or another function) while also performing one or more of the one or more operations described herein.

Figure 10:
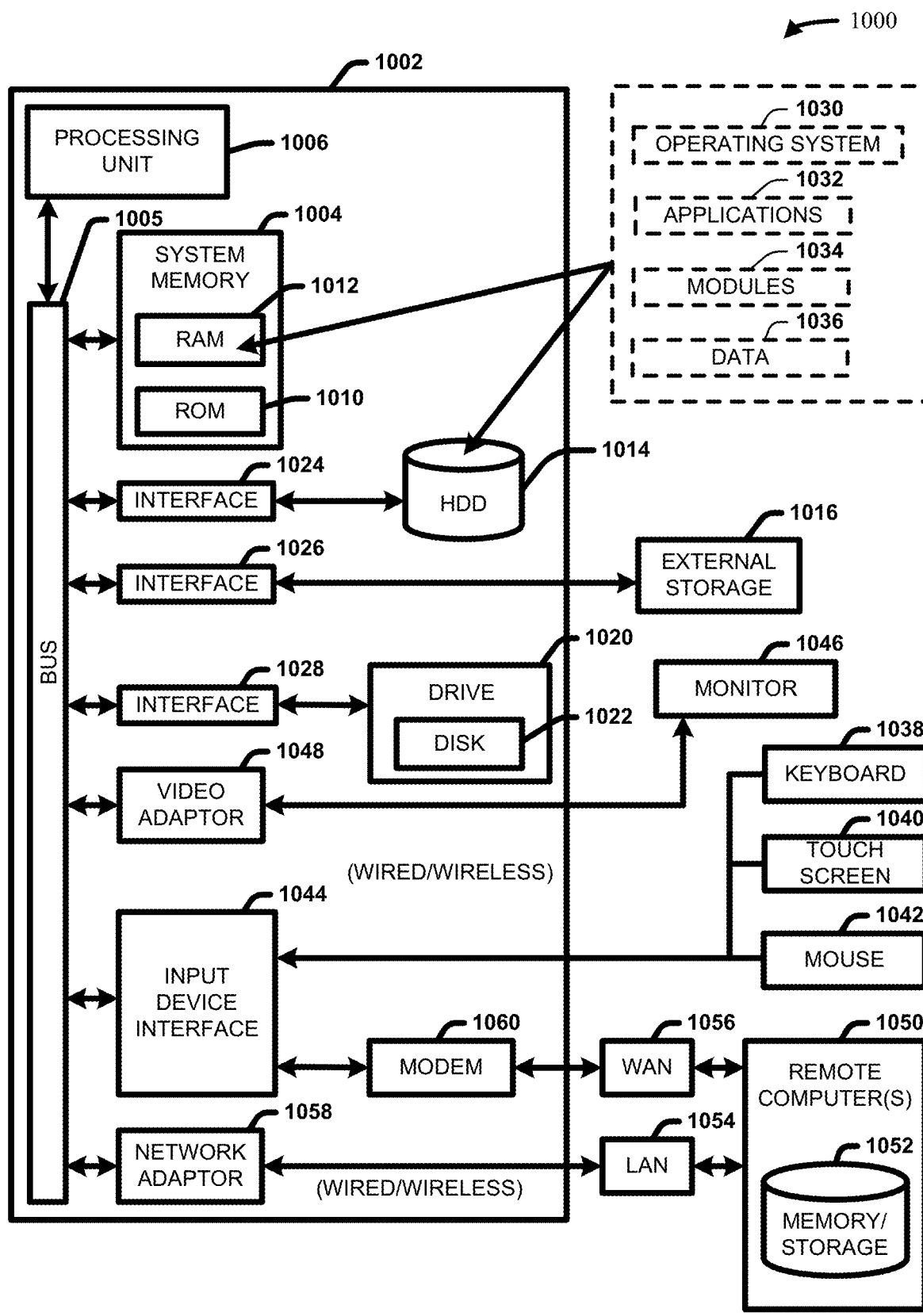
FIG. 10 illustrates a block diagram of an example, non-limiting, operating environment in which one or more embodiments described herein can be operated.
Figure 11:
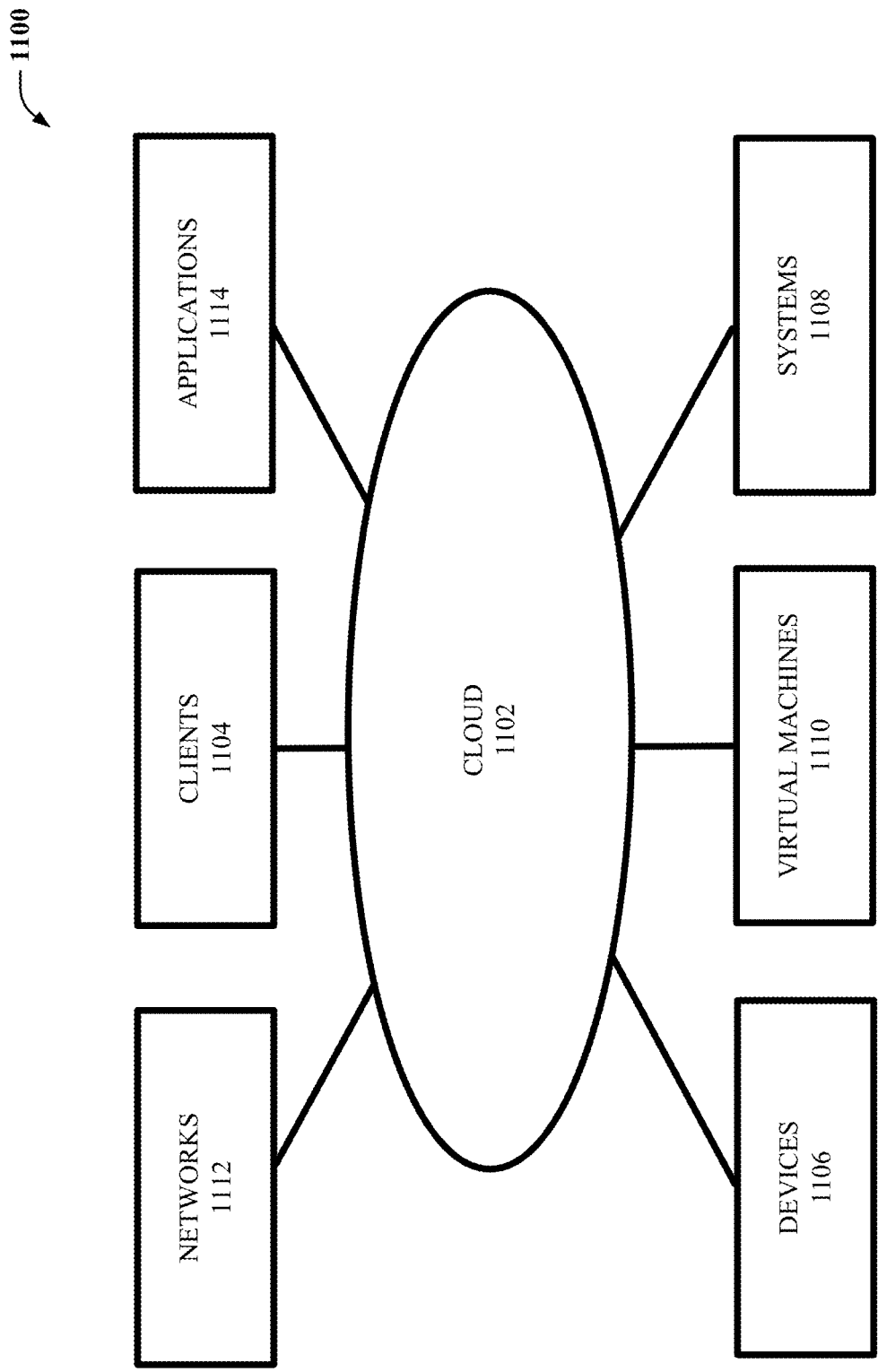
FIG. 11 illustrates a block diagram of an example, non-limiting, cloud computing environment in accordance with one or more embodiments described herein.

Turning next to FIGS. 10 and 11, a detailed description is provided of additional context for the one or more embodiments described herein at FIGS. 1-9.

FIG. 10 and the following discussion are intended to provide a brief, general description of a suitable operating environment 1000 in which one or more embodiments described herein at FIGS. 1-9 can be implemented. For example, one or more components and/or other aspects of embodiments described herein can be implemented in or be associated with, such as accessible via, the operating environment 1000. Further, while one or more embodiments have been described above in the general context of computer-executable instructions that can run on one or more computers, those skilled in the art will recognize that one or more embodiments also can be implemented in combination with other program modules and/or as a combination of hardware and software.

Generally, program modules include routines, programs, components, data structures and/or the like, that perform particular tasks and/or implement particular abstract data types. Moreover, the aforedescribed methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and/or the like, each of which can be operatively coupled to one or more associated devices.

Computing devices typically include a variety of media, which can include computer-readable storage media, machine-readable storage media and/or communications media, which two terms are used herein differently from one another as follows. Computer-readable storage media or machine-readable storage media can be any available storage media that can be accessed by the computer and includes both volatile and nonvolatile media, removable and non-removable media. By way of example, but not limitation, computer-readable storage media and/or machine-readable storage media can be implemented in connection with any method or technology for storage of information such as computer-readable and/or machine-readable instructions, program modules, structured data and/or unstructured data.

Computer-readable storage media can include, but are not limited to, random access memory (RAM), read only memory (ROM), electrically erasable programmable read only memory (EEPROM), flash memory or other memory technology, compact disk read only memory (CD ROM), digital versatile disk (DVD), Blu-ray disc (BD), and/or other optical disk storage, magnetic cassettes, magnetic tape, magnetic disk storage and/or other magnetic storage devices, solid state drives or other solid state storage devices and/or other tangible and/or non-transitory media which can be used to store specified information. In this regard, the terms "tangible" or "non-transitory" herein as applied to storage, memory and/or computer-readable media, are to be understood to exclude only propagating transitory signals per se as modifiers and do not relinquish rights to all standard storage, memory, and/or computer-readable media that are not only propagating transitory signals per se.

Computer-readable storage media can be accessed by one or more local or remote computing devices, e.g., via access requests, queries, and/or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set and/or changed in such a manner as to encode information in one or more signals. By way of example, but not limitation, communication media can include wired media, such as a wired network, direct-wired connection and/or wireless media such as acoustic, RF, infrared, and/or other wireless media.

With reference still to FIG. 10, the example operating environment 1000 for implementing one or more embodiments of the aspects described herein can include a computer 1002, the computer 1002 including a processing unit 1006, a system memory 1004 and/or a system bus 1005. One or more aspects of the processing unit 1006 can be applied to processors such as 106 and/or 206 of the non-limiting systems 100 and/or 200. The processing unit 906 can be implemented in combination with and/or alternatively to processors such as 106 and/or 206.

Memory 1004 can store one or more computer and/or machine readable, writable and/or executable components and/or instructions that, when executed by processing unit 1006 (e.g., a classical processor, and/or like processor), can provide performance of operations defined by the executable component(s) and/or instruction(s). For example, memory 1004 can store computer and/or machine readable, writable, and/or executable components and/or instructions that, when executed by processing unit 1006, can provide execution of the one or more functions described herein relating to non-limiting system 100 and/or non-limiting system 200, as described herein with or without reference to the one or more figures of the one or more embodiments.

Memory 1004 can comprise volatile memory (e.g., random access memory (RAM), static RAM (SRAM), dynamic RAM (DRAM) and/or the like) and/or non-volatile memory (e.g., read only memory (ROM), programmable ROM (PROM), electrically programmable ROM (EPROM), electrically erasable programmable ROM (EEPROM), and/or the like) that can employ one or more memory architectures.

Processing unit 1006 can comprise one or more types of processors and/or electronic circuitry (e.g., a classical processor and/or like processor) that can implement one or more computer and/or machine readable, writable and/or executable components and/or instructions that can be stored at memory 1004. For example, processing unit 1006 can perform one or more operations that can be specified by computer and/or machine readable, writable, and/or executable components and/or instructions including, but not limited to, logic, control, input/output (I/O), arithmetic, and/or the like. In one or more embodiments, processing unit 1006 can be any of one or more commercially available processors. In one or more embodiments, processing unit 1006 can comprise one or more central processing unit, multi-core processor, microprocessor, dual microprocessors, microcontroller, System on a Chip (SOC), array processor, vector processor, and/or another type of processor. The examples of processing unit 1006 can be employed to implement one or more embodiments described herein.

The system bus 1005 can couple system components including, but not limited to, the system memory 1004 to the processing unit 1006. The system bus 1005 can comprise one or more types of bus structure that can further interconnect to a memory bus (with or without a memory controller), a peripheral bus, and/or a local bus using one or more of a variety of commercially available bus architectures. The system memory 1004 can include ROM 1010 and/or RAM 1012. A basic input/output system (BIOS) can be stored in a non-volatile memory such as ROM, erasable programmable read only memory (EPROM) and/or EEPROM, which BIOS contains the basic routines that help to transfer information among elements within the computer 1002, such as during startup. The RAM 1012 can include a high-speed RAM, such as static RAM for caching data.

The computer 1002 can include an internal hard disk drive (HDD) 1014 (e.g., EIDE, SATA), one or more external storage devices 1016 (e.g., a magnetic floppy disk drive (FDD), a memory stick or flash drive reader, a memory card reader and/or the like) and/or a drive 1020, e.g., such as a solid state drive or an optical disk drive, which can read or write from a disk 1022, such as a CD-ROM disc, a DVD, a BD and/or the like. Additionally, and/or alternatively, where a solid state drive is involved, disk 1022 could not be included, unless separate. While the internal HDD 1014 is illustrated as located within the computer 1002, the internal HDD 1014 can also be configured for external use in a suitable chassis (not shown). Additionally, while not shown in operating environment 1000, a solid state drive (SSD) can be used in addition to, or in place of, an HDD 1014. The HDD 1014, external storage device(s) 1016 and drive 1020 can be connected to the system bus 1005 by an HDD interface 1024, an external storage interface 1026 and a drive interface 1028, respectively. The HDD interface 1024 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1002, the drives and storage media accommodate the storage of any data in a suitable digital format. Although the description of computer-readable storage media above refers to respective types of storage devices, other types of storage media which are readable by a computer, whether presently existing or developed in the future, can also be used in the example operating environment, and/or that any such storage media can contain computer-executable instructions for performing the methods described herein.

A number of program modules can be stored in the drives and RAM 1012, including an operating system 1030, one or more applications 1032, other program modules 1034 and/or program data 1036. All or portions of the operating system, applications, modules, and/or data can also be cached in the RAM 1012. The systems and/or methods described herein can be implemented utilizing one or more commercially available operating systems and/or combinations of operating systems.

Computer 1002 can optionally comprise emulation technologies. For example, a hypervisor (not shown) or other intermediary can emulate a hardware environment for operating system 1030, and the emulated hardware can optionally be different from the hardware illustrated in FIG. 10. In a related embodiment, operating system 1030 can comprise one virtual machine (VM) of multiple VMs hosted at computer 1002. Furthermore, operating system 1030 can provide runtime environments, such as the JAVA runtime environment or the .NET framework, for applications 1032. Runtime environments are consistent execution environments that can allow applications 1032 to run on any operating system that includes the runtime environment. Similarly, operating system 1030 can support containers, and applications 1032 can be in the form of containers, which are lightweight, standalone, executable packages of software that include, e.g., code, runtime, system tools, system libraries and/or settings for an application.

Further, computer 1002 can be enabled with a security module, such as a trusted processing module (TPM). For instance, with a TPM, boot components hash next in time boot components and wait for a match of results to secured values before loading a next boot component. This process can take place at any layer in the code execution stack of computer 1002, e.g., applied at application execution level and/or at operating system (OS) kernel level, thereby enabling security at any level of code execution.

An entity can enter and/or transmit commands and/or information into the computer 1002 through one or more wired/wireless input devices, e.g., a keyboard 1038, a touch screen 1040 and/or a pointing device, such as a mouse 1042. Other input devices (not shown) can include a microphone, an infrared (IR) remote control, a radio frequency (RF) remote control, and/or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint and/or iris scanner, and/or the like. These and other input devices can be connected to the processing unit 1006 through an input device interface 1044 that can be coupled to the system bus 1005, but can be connected by other interfaces, such as a parallel port, an IEEE 1394 serial port, a game port, a USB port, an IR interface, a BLUETOOTH® interface, and/or the like.

A monitor 1046 or other type of display device can be alternatively and/or additionally connected to the system bus 1005 via an interface, such as a video adapter 1048. In addition to the monitor 1046, a computer typically includes other peripheral output devices (not shown), such as speakers, printers, and/or the like.

The computer 1002 can operate in a networked environment using logical connections via wired and/or wireless communications to one or more remote computers, such as a remote computer(s) 1050. The remote computer(s) 1050 can be a workstation, a server computer, a router, a personal computer, portable computer, microprocessor-based entertainment appliance, a peer device and/or other common network node, and typically includes many or all of the elements described relative to the computer 1002, although, for purposes of brevity, only a memory/storage device 1052 is illustrated. Additionally, and/or alternatively, the computer 1002 can be coupled (e.g., communicatively, electrically, operatively, optically and/or the like) to one or more external systems, sources, and/or devices (e.g., computing devices, communication devices and/or like device) via a data cable (e.g., High-Definition Multimedia Interface (HDMI), recommended standard (RS) 232, Ethernet cable and/or the like).

In one or more embodiments, a network can comprise one or more wired and/or wireless networks, including, but not limited to, a cellular network, a wide area network (WAN) (e.g., the Internet), or a local area network (LAN). For example, one or more embodiments described herein can communicate with one or more external systems, sources and/or devices, for instance, computing devices (and vice versa) using virtually any specified wired or wireless technology, including but not limited to: wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra-mobile broadband (UMB), high speed packet access (HSPA), Zigbee and other 802.XX wireless technologies and/or legacy telecommunication technologies, BLUETOOTH®, Session Initiation Protocol (SIP), ZIGBEE®, RF4CE protocol, WirelessHART protocol, 6LoWPAN (IPv6 over Low power Wireless Area Networks), Z-Wave, an ANT, an ultra-wideband (UWB) standard protocol, and/or other proprietary and/or non-proprietary communication protocols. In a related example, one or more embodiments described herein can include hardware (e.g., a central processing unit (CPU), a transceiver, a decoder, and/or the like), software (e.g., a set of threads, a set of processes, software in execution and/or the like) and/or a combination of hardware and/or software that provides communicating information among one or more embodiments described herein and external systems, sources, and/or devices (e.g., computing devices, communication devices and/or the like).

The logical connections depicted include wired/wireless connectivity to a local area network (LAN) 1054 and/or larger networks, e.g., a wide area network (WAN) 1056. LAN and WAN networking environments can be commonplace in offices and companies and can provide enterprise-wide computer networks, such as intranets, all of which can connect to a global communications network, e.g., the Internet.

When used in a LAN networking environment, the computer 1002 can be connected to the local network 1054 through a wired and/or wireless communication network interface or adapter 1058. The adapter 1058 can provide wired and/or wireless communication to the LAN 1054, which can also include a wireless access point (AP) disposed thereon for communicating with the adapter 1058 in a wireless mode.

When used in a WAN networking environment, the computer 1002 can include a modem 1060 and/or can be connected to a communications server on the WAN 1056 via other means for establishing communications over the WAN 1056, such as by way of the Internet. The modem 1060, which can be internal and/or external and a wired and/or wireless device, can be connected to the system bus 1005 via the input device interface 1044. In a networked environment, program modules depicted relative to the computer 1002 or portions thereof can be stored in the remote memory/storage device 1052. The network connections shown are merely exemplary and one or more other means of establishing a communications link among the computers can be used.

When used in either a LAN or WAN networking environment, the computer 1002 can access cloud storage systems or other network-based storage systems in addition to, and/or in place of, external storage devices 1016 as described above, such as but not limited to, a network virtual machine providing one or more aspects of storage and/or processing of information. Generally, a connection between the computer 1002 and a cloud storage system can be established over a LAN 1054 or WAN 1056 e.g., by the adapter 1058 or modem 1060, respectively. Upon connecting the computer 1002 to an associated cloud storage system, the external storage interface 1026 can, such as with the aid of the adapter 1058 and/or modem 1060, manage storage provided by the cloud storage system as it would other types of external storage. For instance, the external storage interface 1026 can be configured to provide access to cloud storage sources as if those sources were physically connected to the computer 1002.

The computer 1002 can be operable to communicate with any wireless devices and/or entities operatively disposed in wireless communication, e.g., a printer, scanner, desktop, and/or portable computer, portable data assistant, communications satellite, telephone, and/or any piece of equipment or location associated with a wirelessly detectable tag (e.g., a kiosk, news stand, store shelf and/or the like). This can include Wireless Fidelity (Wi-Fi) and BLUETOOTH® wireless technologies. Thus, the communication can be a predefined structure as with a conventional network or simply an ad hoc communication between at least two devices.

The illustrated embodiments described herein can be employed relative to distributed computing environments (e.g., cloud computing environments), such as described below with respect to FIG. 11, where certain tasks are performed by remote processing devices that are linked through a communications network. In a distributed computing environment, program modules can be located both in local and/or remote memory storage devices.

For example, one or more embodiments described herein and/or one or more components thereof can employ one or more computing resources of the cloud computing environment 1102 described below with reference to illustration 1100 of FIG. 11. For instance, one or more embodiments described herein and/or components thereof can employ such one or more resources to execute one or more: mathematical function, calculation and/or equation; computing and/or processing script; algorithm; model (e.g., artificial intelligence (AI) model, machine learning (ML) model, deep learning (DL) model, and/or like model); and/or other operation in accordance with one or more embodiments described herein.

It is to be understood that although one or more embodiments described herein include a detailed description on cloud computing, implementation of the teachings recited herein are not limited to a cloud computing environment. Rather, one or more embodiments described herein are capable of being implemented in conjunction with any other type of computing environment now known or later developed. That is, the one or more embodiments described herein can be implemented in a local environment only, and/or a non-cloud-integrated distributed environment, for example.

A cloud computing environment can provide one or more of low coupling, modularity and/or semantic interoperability. At the heart of cloud computing is an infrastructure that includes a network of interconnected aspects.

Moreover, the non-limiting systems 100 and/or 200, and/or the example operating environment 1000 of FIG. 10, can be associated with and/or be included in cloud-based and/or partially-cloud-based system.

Referring now to details of one or more elements illustrated at FIG. 11, the illustrative cloud computing environment 1102 is depicted. Cloud computing environment 1102 can comprise one or more cloud computing nodes, virtual machines, and/or the like with which local computing devices used by cloud clients 1104, such as for example via one or more devices 1106, systems 1108, virtual machines 1110, networks 1112, and/or applications 1114.

The one or more cloud computing nodes, virtual machines and/or the like can be grouped physically or virtually, in one or more networks, such as local, distributed, private, public clouds, and/or a combination thereof. The cloud computing environment 1102 can provide infrastructure, platforms, virtual machines, and/or software for which a client 1104 does not maintain all or at least a portion of resources on a local device, such as a computing device. The various elements 1106 to 1112 are not intended to be limiting and are but some of various examples of computerized elements that can communicate with one another and/or with the one or more cloud computing nodes via the cloud computing environment 1102, such as over any suitable network connection and/or type.

The embodiments described herein can be directed to one or more of a system, a method, an apparatus, and/or a computer program product at any possible technical detail level of integration. The computer program product can include a computer readable storage medium (or media) having computer readable program instructions thereon for causing a processor to carry out aspects of the one or more embodiments described herein. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a superconducting storage device, and/or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon and/or any suitable combination of the foregoing. A computer readable storage medium, as used herein, is not to be construed as being transitory signals per se, such as radio waves and/or other freely propagating electromagnetic waves, electromagnetic waves propagating through a waveguide and/or other transmission media (e.g., light pulses passing through a fiber-optic cable), and/or electrical signals transmitted through a wire.

Computer readable program instructions described herein can be downloaded to respective computing/processing devices from a computer readable storage medium and/or to an external computer or external storage device via a network, for example, the Internet, a local area network, a wide area network and/or a wireless network. The network can comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the one or more embodiments described herein can be assembler instructions, instruction-set-architecture (ISA) instructions, machine instructions, machine dependent instructions, microcode, firmware instructions, state-setting data, configuration data for integrated circuitry, and/or source code and/or object code written in any combination of one or more programming languages, including an object oriented programming language such as Smalltalk, C++ or the like, and/or procedural programming languages, such as the "C" programming language and/or similar programming languages. The computer readable program instructions can execute entirely on a computer, partly on a computer, as a stand-alone software package, partly on a computer and/or partly on a remote computer or entirely on the remote computer and/or server. In the latter scenario, the remote computer can be connected to a computer through any type of network, including a local area network (LAN) and/or a wide area network (WAN), and/or the connection can be made to an external computer (for example, through the Internet using an Internet Service Provider). In one or more embodiments, electronic circuitry including, for example, programmable logic circuitry, field-programmable gate arrays (FPGA), and/or programmable logic arrays (PLA) can execute the computer readable program instructions by utilizing state information of the computer readable program instructions to personalize the electronic circuitry, in order to perform aspects of the one or more embodiments described herein.

Aspects of the one or more embodiments described herein are described with reference to flowchart illustrations and/or block diagrams of methods, apparatus (systems), and computer program products according to one or more embodiments described herein. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general purpose computer, special purpose computer and/or other programmable data processing apparatus to produce a machine, such that the instructions, which execute via the processor of the computer or other programmable data processing apparatus, can create means for implementing the functions/acts specified in the flowchart and/or block diagram block or blocks. These computer readable program instructions can also be stored in a computer readable storage medium that can direct a computer, a programmable data processing apparatus and/or other devices to function in a particular manner, such that the computer readable storage medium having instructions stored therein can comprise an article of manufacture including instructions which can implement aspects of the function/act specified in the flowchart and/or block diagram block or blocks. The computer readable program instructions can also be loaded onto a computer, other programmable data processing apparatus and/or other device to cause a series of operational acts to be performed on the computer, other programmable apparatus and/or other device to produce a computer implemented process, such that the instructions which execute on the computer, other programmable apparatus and/or other device implement the functions/acts specified in the flowchart and/or block diagram block or blocks.

The flowcharts and block diagrams in the figures illustrate the architecture, functionality and/or operation of possible implementations of systems, computer-implementable methods and/or computer program products according to one or more embodiments described herein. In this regard, each block in the flowchart or block diagrams can represent a module, segment and/or portion of instructions, which comprises one or more executable instructions for implementing the specified logical function(s). In one or more alternative implementations, the functions noted in the blocks can occur out of the order noted in the Figures. For example, two blocks shown in succession can be executed substantially concurrently, and/or the blocks can sometimes be executed in the reverse order, depending upon the functionality involved. It will also be noted that each block of the block diagrams and/or flowchart illustration, and/or combinations of blocks in the block diagrams and/or flowchart illustration, can be implemented by special purpose hardware-based systems that can perform the specified functions and/or acts and/or carry out one or more combinations of special purpose hardware and/or computer instructions.

While the subject matter has been described above in the general context of computer-executable instructions of a computer program product that runs on a computer and/or computers, those skilled in the art will recognize that the one or more embodiments herein also can be implemented in combination with one or more other program modules. Generally, program modules include routines, programs, components, data structures, and/or the like that perform particular tasks and/or implement particular abstract data types. Moreover, the aforedescribed computer-implemented methods can be practiced with other computer system configurations, including single-processor and/or multiprocessor computer systems, mini-computing devices, mainframe computers, as well as computers, hand-held computing devices (e.g., PDA, phone), microprocessor-based or programmable consumer and/or industrial electronics and/or the like. The illustrated aspects can also be practiced in distributed computing environments in which tasks are performed by remote processing devices that are linked through a communications network. However, one or more, if not all aspects of the one or more embodiments described herein can be practiced on stand-alone computers. In a distributed computing environment, program modules can be located in both local and remote memory storage devices.

As used in this application, the terms "component," "system," "platform," "interface," and/or the like, can refer to and/or can include a computer-related entity or an entity related to an operational machine with one or more specific functionalities. The entities described herein can be either hardware, a combination of hardware and software, software, or software in execution. For example, a component can be, but is not limited to being, a process running on a processor, a processor, an object, an executable, a thread of execution, a program and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system and/or across a network such as the Internet with other systems via the signal). As another example, a component can be an apparatus with specific functionality provided by mechanical parts operated by electric or electronic circuitry, which is operated by a software and/or firmware application executed by a processor. In such a case, the processor can be internal and/or external to the apparatus and can execute at least a part of the software and/or firmware application. As yet another example, a component can be an apparatus that provides specific functionality through electronic components without mechanical parts, where the electronic components can include a processor and/or other means to execute software and/or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter described herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit and/or device comprising, but not limited to, single-core processors; single-processors with software multithread execution capability; multi-core processors; multi-core processors with software multithread execution capability; multi-core processors with hardware multithread technology; parallel platforms; and/or parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, and/or any combination thereof designed to perform the functions described herein. Further, processors can exploit nano-scale architectures such as, but not limited to, molecular based transistors, switches and/or gates, in order to optimize space usage and/or to enhance performance of related equipment. A processor can be implemented as a combination of computing processing units.

Herein, terms such as "store," "storage," "data store," data storage," "database," and substantially any other information storage component relevant to operation and functionality of a component are utilized to refer to "memory components," entities embodied in a "memory," or components comprising a memory. Memory and/or memory components described herein can be either volatile memory or nonvolatile memory or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, and/or nonvolatile random access memory (RAM) (e.g., ferroelectric RAM (FeRAM). Volatile memory can include RAM, which can act as external cache memory, for example. By way of illustration and not limitation, RAM can be available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM) and/or Rambus dynamic RAM (RDRAM). Additionally, the described memory components of systems and/or computer-implemented methods herein are intended to include, without being limited to including, these and/or any other suitable types of memory.

What has been described above includes mere examples of systems and computer-implemented methods. It is, of course, not possible to describe every conceivable combination of components and/or computer-implemented methods for purposes of describing the one or more embodiments, but one of ordinary skill in the art can recognize that many further combinations and/or permutations of the one or more embodiments are possible. Furthermore, to the extent that the terms "includes," "has," "possesses," and the like are used in the detailed description, claims, appendices and/or drawings such terms are intended to be inclusive in a manner similar to the term "comprising" as "comprising" is interpreted when employed as a transitional word in a claim.

The descriptions of the one or more embodiments have been presented for purposes of illustration but are not intended to be exhaustive or limited to the embodiments described herein. Many modifications and variations will be apparent to those of ordinary skill in the art without departing from the scope and spirit of the described embodiments. The terminology used herein was chosen to best explain the principles of the embodiments, the practical application and/or technical improvement over technologies found in the marketplace, and/or to enable others of ordinary skill in the art to understand the embodiments described herein.

What is claimed is:

1. A system, comprising:
   a memory that stores computer executable components; and
   a processor that executes at least one of the computer executable components that:
   obtains, from one or more ultrasonic sensors, first raw data defining a first representation of an environment around an object from a vantage of the object;
   generates, using the first raw data, first polygon measurements of a boundary of a first polygon, wherein the first polygon represents a first region extending from the object within a first combined measurement range of the one or more ultrasonic sensors that is free from obstacles;
   obtains, from one or more camera sensors, second raw data defining a second representation of the environment around the object from the vantage of the object;
   generates, using the second raw data, second polygon measurements of a boundary of a second polygon, wherein the second polygon represents a second region extending from the object within a second combined measurement range of the one or more camera sensors that is free from obstacles; and
   generates, based on a defined process that employs a combination of the first polygon measurements and the second polygon measurements, third polygon measurements of a boundary of a virtual polygon representing an obstacle-free region about the object.

2. The system of claim 1, wherein the boundary of the virtual polygon extends vertically from a surface on which the object is resting.

3. The system of claim 1, wherein the object is a vehicle.

4. The system of claim 1, wherein the object comprises the one or more ultrasonic sensors and the one or more camera sensors.

5. The system of claim 1, wherein the generating the third polygon measurements comprises performing a homographic transformation on at least one of the first polygon measurements or the second polygon measurements.

6. The system of claim 1, wherein the generating the third polygon measurements comprises:
adjusts at least one of the first polygon measurements or the second polygon measurements relative to each other based on observed noise.

7. The system of claim 1, wherein the generating the third polygon measurements comprises:
obtaining, from an auxiliary sensor, at least one auxiliary measurement associated with the object related to at least one of weather, moisture, precipitation, steering wheel angle, axle, or wheel speed; and
applying respective weights to the first polygon measurements and the second polygon measurements based on the at least one auxiliary measurement.

8. The system of claim 1, wherein the at least one of the computer executable components further:
autonomously controls movement of the object based on the virtual polygon.

9. A computer-implemented method, comprising:
obtaining, by a system operatively coupled to a processor, from one or more ultrasonic sensors, first raw data defining a first representation of an environment around a vehicle from a vantage of the vehicle;
generating, by the system, using the first raw data, first polygon measurements of a boundary of a first polygon, wherein the first polygon represents a first region extending from the vehicle within a first combined measurement range of the one or more ultrasonic sensors that is free from obstacles;
obtaining, by the system, from one or more camera sensors, second raw data defining a second representation of the environment around the vehicle from the vantage of the vehicle;
generating, using the second raw data, second polygon measurements of a boundary of a second polygon, wherein the second polygon represents a second region extending from the vehicle within a second combined measurement range of the one or more camera sensors that is free from obstacles; and
generating, by the system, based on a defined process that employs a combination of the first polygon measurements and the second polygon measurements, third polygon measurements of a boundary of a virtual polygon representing an obstacle-free region about the vehicle.

10. The computer-implemented method of claim 9, wherein the vehicle comprises the one or more ultrasonic sensors and the one or more camera sensors.

11. The computer-implemented method of claim 9, wherein the first polygon measurements comprise first vertices and respective first distances from the vehicle to the first vertices, and wherein the second polygon measurements comprise second vertices and respective second distances from the vehicle to the second vertices.

12. The computer-implemented method of claim 9, wherein the generating the third polygon measurements comprises:
performing a homographic transformation on at least one of the first polygon measurements or the second polygon measurements.

13. The computer-implemented method of claim 9, wherein the generating the third polygon measurements comprises:
obtaining, from an auxiliary sensor, at least one measurement associated with the vehicle related to at least one of weather, moisture, precipitation, steering wheel angle, axle, or wheel speed; and
applying respective weights to the first polygon measurements and the second polygon measurements based on the at least one auxiliary measurement.

14. The computer-implemented method of claim 9, wherein the generating the third polygon measurements comprises:
adjusting at least one of the first polygon measurements or the second polygon measurements relative to each other based on observed noise.

15. The computer-implemented method of claim 9, further comprising:
autonomously controlling, by the system, movement of the vehicle based on the virtual polygon.

16. The computer-implemented method of claim 9, further comprising:
employing, by the system, the third polygon measurements of the boundary of the virtual polygon as a basis for a subsequent generation of another virtual polygon.

17. A computer program product providing a process to determine free space around an object, the computer program product comprising a non-transitory computer readable medium having program instructions embodied therewith, the program instructions executable by a processor to cause the processor to:
obtain, from one or more ultrasonic sensors, first raw data defining a first representation of an environment around a vehicle from a vantage of the vehicle;
generate, using the first raw data, first polygon measurements of a boundary of a first polygon, wherein the first polygon represents a first region extending from the vehicle within a first combined measurement range of the one or more ultrasonic sensors that is free from obstacles;
obtain, from one or more camera sensors, second raw data defining a second representation of the environment around the vehicle from the vantage of the vehicle;
generate, using the second raw data, second polygon measurements of a boundary of a second polygon, wherein the second polygon represents a second region extending from the vehicle within a second combined measurement range of the one or more camera sensors that is free from obstacles; and
generate, based on a defined process that employs a combination of the first polygon measurements and the second polygon measurements, third polygon measurements of a boundary of a virtual polygon representing an obstacle-free region about the vehicle.

18. The computer program product of claim 17, wherein the vehicle comprises the one or more ultrasonic sensors and the one or more camera sensors.

19. The computer program product of claim 17, wherein the first polygon measurements comprise first vertices and respective first distances from the vehicle to the first vertices, and wherein the second polygon measurements comprise second vertices and respective second distances from the vehicle to the second vertices.

20. The computer program product of claim 17, wherein the generating the third polygon measurements comprises:
adjusting at least one of the first polygon measurements or the second polygon measurements relative to each other based on observed noise.

* * * * *